US012656876B2

(12) United States Patent    (10) Patent No.:   US 12,656,876 B2
Chambers et al.    (45) Date of Patent:    Jun. 16, 2026

(54) REFINING GESTURE MODELS

(71) Applicant: Snap Inc., Santa Monica, CA (US)

(72) Inventors: Laura Bliss Chambers, Venice, CA (US); Jonathan Solichin, Arcadia, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/398,672

(22) Filed: Dec. 28, 2023

(65) Prior Publication Data

US 2025/0216947 A1    Jul. 3, 2025

(51) Int. Cl.
   *G06F 3/01*      (2006.01)
   *G06V 40/20*    (2022.01)

(52) U.S. Cl.
   CPC .............. *G06F 3/017* (2013.01); *G06V 40/28* (2022.01)

(58) Field of Classification Search
   None
   See application file for complete search history.

(56) References Cited

U.S. PATENT DOCUMENTS

| | | | |
|---|---|---|---|
| 7,971,156 B2 | 6/2011 | Albertson et al. | |
| 9,225,897 B1 | 12/2015 | Sehn et al. | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,803,616 B1 | 10/2020 | Twigg et al. | |
| 10,958,608 B1 | 3/2021 | Allen et al. | |

(Continued)

FOREIGN PATENT DOCUMENTS

| | | |
|---|---|---|
| EP | 3707693 A1 | 9/2020 |
| EP | 4172726 A1 | 5/2023 |

(Continued)

OTHER PUBLICATIONS

"International Application Serial No. PCT/US2024/060365, International Search Report mailed Apr. 15, 2025", 4 pgs.

(Continued)

*Primary Examiner* — Ifedayo B Iluyomade
(74) *Attorney, Agent, or Firm* — Schwegman Lundberg & Woessner, P.A.

(57) ABSTRACT

A model generation system captures, using cameras, hand-tracking data of a gesture made by a user demonstrating the gesture. The model generation system generates a three-dimensional model of the gesture using the hand-tracking data and provides a display of the three-dimensional model to the user. The model generation system receives, from the user, model refining data refining the three-dimensional model. The model generation system generates a refined three-dimensional model of the gesture using the model refining data and the three-dimensional model. The refined three-dimensional model is used for detecting the gesture.

21 Claims, 15 Drawing Sheets

(56) References Cited

U.S. PATENT DOCUMENTS

| | | | |
|---|---|---|---|
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 11,798,201 B2 | 10/2023 | Eirinberg et al. | |
| 11,841,920 B1 | 12/2023 | Marsden et al. | |
| 2009/0254367 A1* | 10/2009 | Belcher | G16H 20/40 |
| | | | 705/26.1 |
| 2012/0051588 A1 | 3/2012 | Mceldowney | |
| 2019/0146219 A1 | 5/2019 | Rodriguez, II | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2023/0214458 A1* | 7/2023 | Marsden | G06V 40/28 |
| | | | 382/157 |

FOREIGN PATENT DOCUMENTS

| | | |
|---|---|---|
| EP | 4172730 A1 | 5/2023 |
| KR | 20220158824 A | 12/2022 |
| WO | 2019094618 A1 | 5/2019 |
| WO | 2022005687 A1 | 1/2022 |
| WO | 2022005693 A1 | 1/2022 |
| WO | 2022060549 A3 | 3/2022 |
| WO | 2022066578 A1 | 3/2022 |
| WO | 2022060549 A2 | 4/2022 |
| WO | 2022132381 A1 | 6/2022 |
| WO | 2022146678 A1 | 7/2022 |
| WO | 2022198182 A1 | 9/2022 |
| WO | 2022216784 A1 | 10/2022 |
| WO | 2022225761 A1 | 10/2022 |
| WO | 2022245765 A1 | 11/2022 |

OTHER PUBLICATIONS

"International Application Serial No. PCT/US2024/060365, Written Opinion mailed Apr. 15, 2025", 6 pgs.

\* cited by examiner

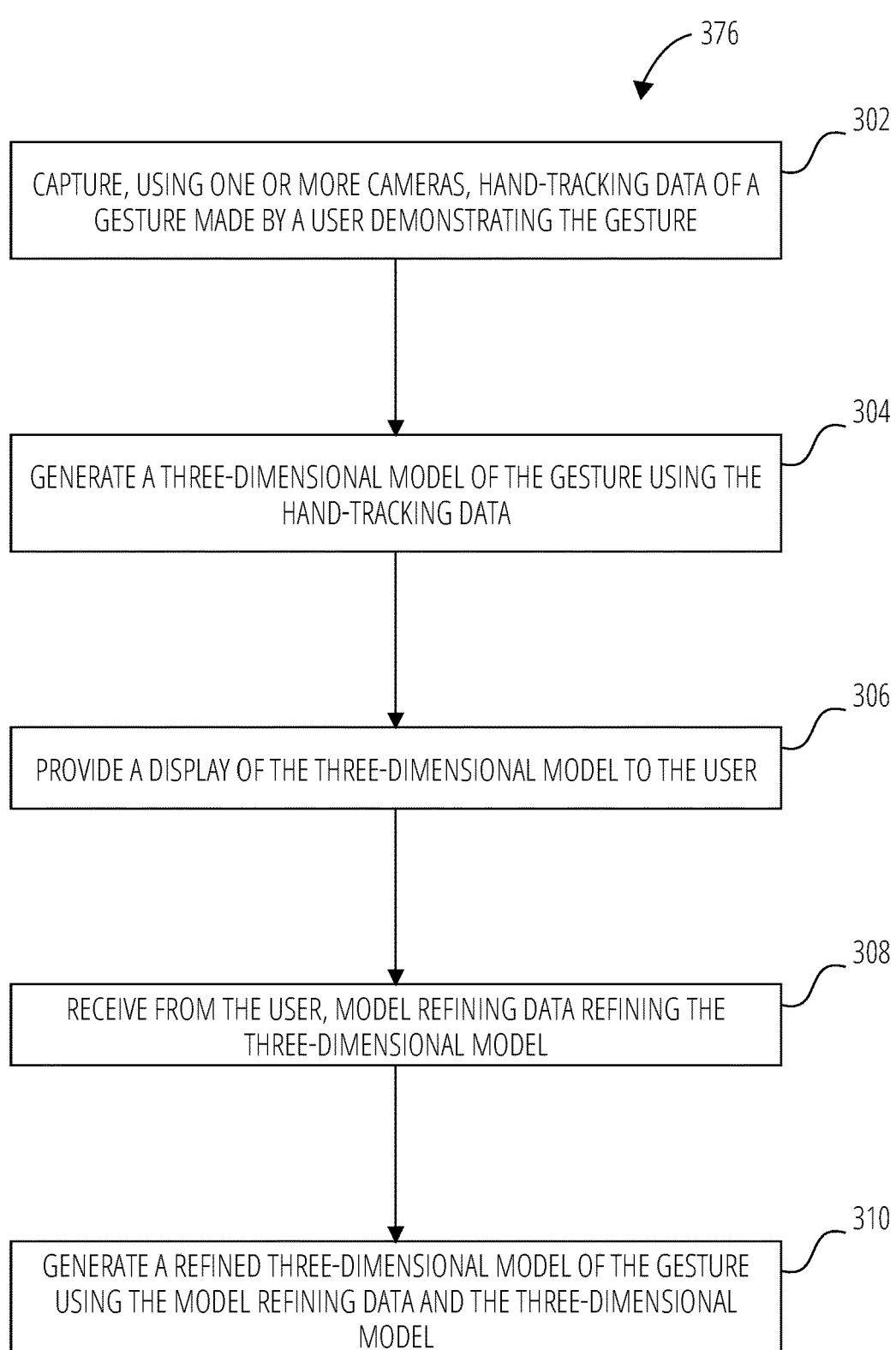

376

302

CAPTURE, USING ONE OR MORE CAMERAS, HAND-TRACKING DATA OF A GESTURE MADE BY A USER DEMONSTRATING THE GESTURE

304

GENERATE A THREE-DIMENSIONAL MODEL OF THE GESTURE USING THE HAND-TRACKING DATA

306

PROVIDE A DISPLAY OF THE THREE-DIMENSIONAL MODEL TO THE USER

308

RECEIVE FROM THE USER, MODEL REFINING DATA REFINING THE THREE-DIMENSIONAL MODEL

310

GENERATE A REFINED THREE-DIMENSIONAL MODEL OF THE GESTURE USING THE MODEL REFINING DATA AND THE THREE-DIMENSIONAL MODEL

GENERATE XR USER INTERFACE

504

CAPTURE, USING ONE OR MORE CAMERAS, HAND-TRACKING DATA OF A GESTURE MADE BY A USER

506

DETERMINE GESTURE USING GESTURE MODEL LIBRARY AND THE HAND-TRACKING DATA

508

DETERMINE DIALOG STATE USING THE GESTURE AND AN XR USER INTERFACE OBJECT MODEL

REFINING GESTURE MODELS

TECHNICAL FIELD

The present disclosure relates generally to developing user interfaces and, more particularly, to developing user interfaces used for extended reality.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term extended Reality (XR) refers to augmented reality, virtual reality and any of hybrids of these technologies unless the context indicates otherwise.

A user of the head-wearable apparatus may access and use a computer software application to perform various tasks or engage in an entertaining activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 3B is an activity diagram of a three-dimensional model refinement method, according to some examples.

DETAILED DESCRIPTION

Figure 1A:
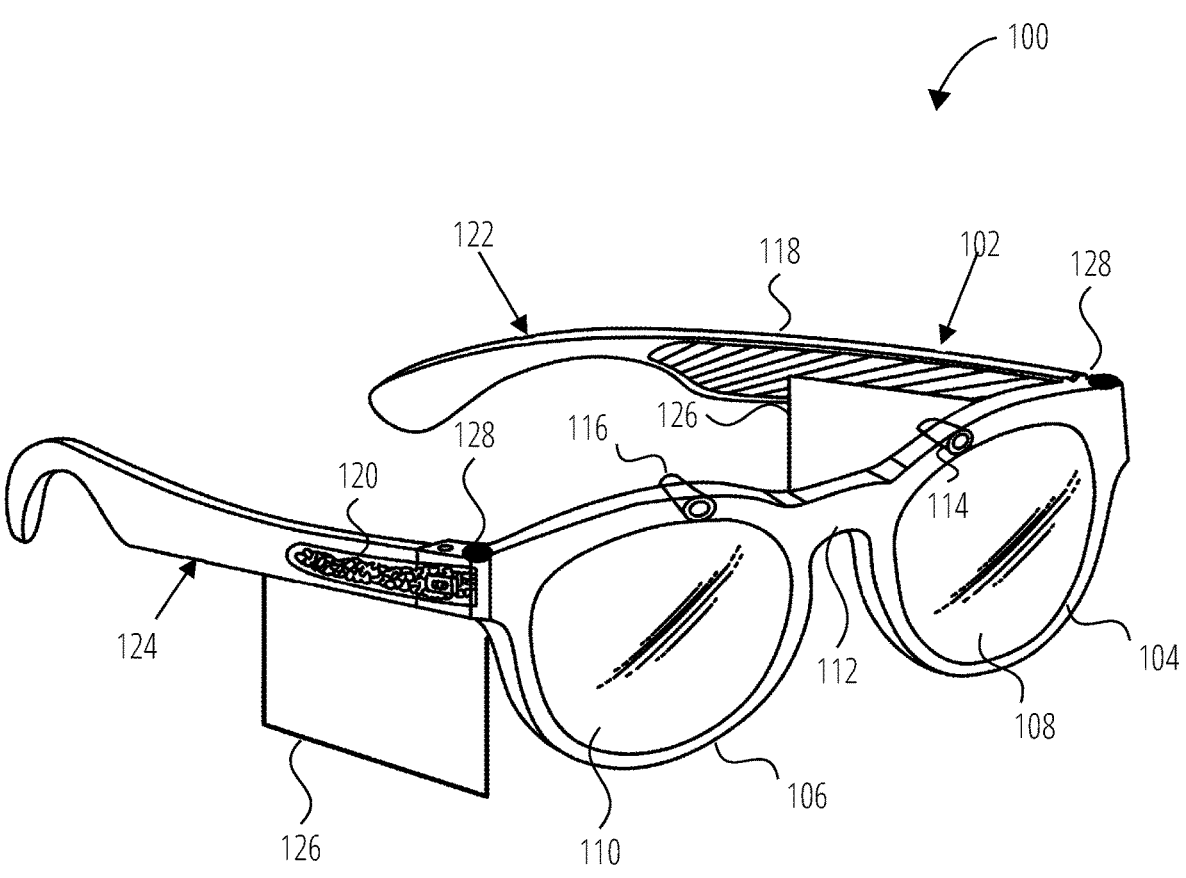
FIG. 1A is a perspective view of a head-worn device, according to some examples.

Hand-tracking is a way to provide user inputs from a user into an XR user interface provided by an XR system. The XR system tracks one or more of the user's hands using cameras and computer vision methodologies. The XR system determines hand poses or gestures being made by the user using video images captured by the cameras. In some XR systems, the XR user interface includes one or more virtual objects that are manipulated by the user, termed Direct Manipulation of Virtual Objects (DMVO). In some examples, free gestures not associated with a virtual object are used as an input modality into a user interface. In some examples, free gestures are used as an input modality for controlling a device or component of a system.

Use of human input devices that are touched-based or haptic is not an optimal input modality for XR systems. To achieve an immersive or useful user interface, the attention of the user is directed to the virtual objects being displayed to the user and having the user divert their attention to make a selection from a keyboard, keypad, touch surface, or the like is disruptive to the user's attention on the virtual object. In addition, XR systems are designed to be as small as possible so that they are unobtrusive. Accordingly, there is limited surface area available for haptic input devices. Finally, having haptic input devices adds complexity and additional potential points of failure to the XR system. As an XR system may not have haptic inputs or may not be able to track both hands of the user, methodologies for determining the user's intent are desirable.

However, current interaction modalities have limitations. Predefined gestures from the platform may be limited. Custom machine learning models require expertise. Heuristic algorithms need programming knowledge. This makes creating expressive, custom interactions difficult for XR application developers. The methodologies described in this disclosure provide an accessible way for XR application developers to define custom, natural gestures and sequences to interact in an XR experience, without needing coding or machine learning expertise.

In some examples, a user visually demonstrates gestures, that are captured by a computer vision system. The user can then refine the gesture through a three-dimensional editor interface. This generates a refined three-dimensional model of the gesture comprising joints and geometry that precisely define the gesture. The refined three-dimensional model is used to recognize the gesture from user hand-tracking data.

In some examples, multiple gestures can be chained together into sequences. The refined three-dimensional model and sequence instructions are stored in a gesture model library. At runtime, the system detects the gestures and sequences for natural interaction using the gesture model library.

In some examples, a model generation system captures, using cameras, hand-tracking data of a gesture made by a user demonstrating the gesture. The model generation system generates a three-dimensional model of the gesture using the hand-tracking data. And provides a display of the three-dimensional model to the user. The model generation system receives model refining data from the user refining the three-dimensional model and generates a refined three-dimensional model of the gesture using the model refining data and the three-dimensional model.

In some examples, the gesture data includes joint position data.

In some examples, the hand-tracking data includes video data.

In some examples, generating the three-dimensional model includes generating a model of the user's hand.

In some examples, providing the display includes displaying the three-dimensional model on a graphical user interface.

In some examples, the model refining data includes selections of joints to remove from the model.

In some examples, the model refining data includes manipulated positions of joints.

Other technical features may be readily apparent to one skilled in the art from the following figures, descriptions, and claims.

FIG. 1A is a perspective view of a head-wearable apparatus 100 according to some examples. The head-wearable apparatus 100 may be a client device of an XR system, such a computing system 902 of FIG. 9. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below in FIG. 8, the computer 120 includes low-power circuitry 826, high-speed circuitry 828, and a display processor. Various other examples may include these elements in different configurations or integrated together in different ways. Additional details of aspects of the computer 120 may be implemented as illustrated by the machine 200 (of FIG. 2).

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world scene.

The head-wearable apparatus 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
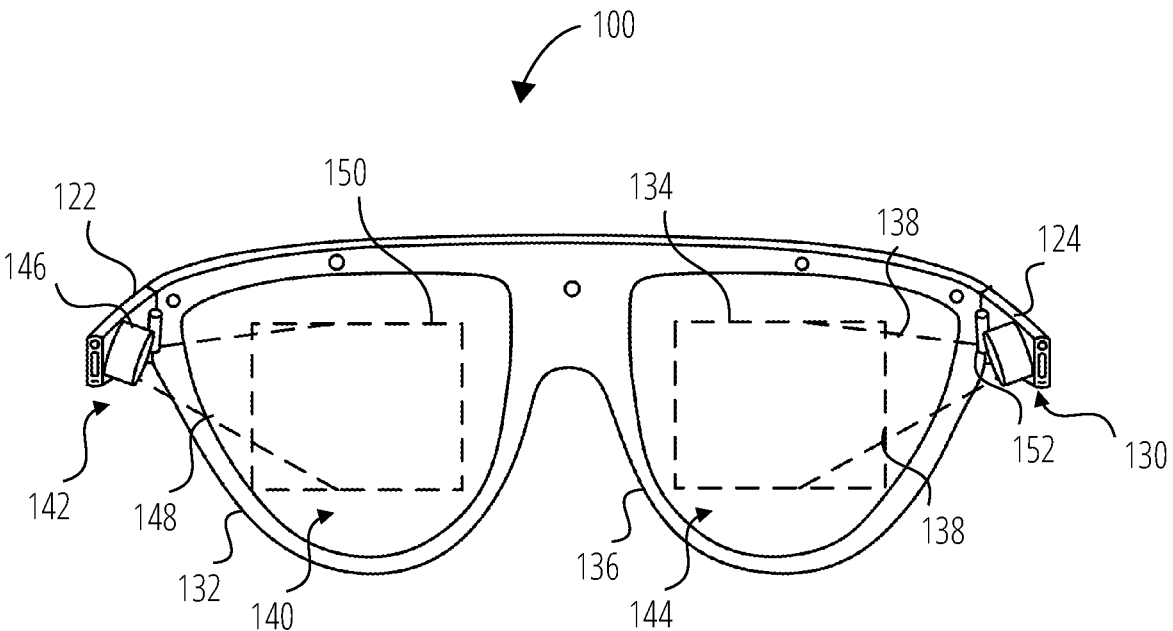
FIG. 1B illustrates a further view of the head-worn device of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations may be utilized within an optical engine to display an image to a user in the user's field of view. For example, instead of a projector and a waveguide, an LCD, LED or other display panel or surface may be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 814 illustrated in FIG. 8), and/or hand movements, locations, and positions recognized by the head-wearable apparatus 100.

In some examples, an optical engine of an XR system is incorporated into a lens that is contact with a user's eye, such as a contact lens or the like. The XR system generates images of an XR experience using the contact lens.

In some examples, the head-wearable apparatus 100 includes an XR system. In some examples, the head-wearable apparatus 100 is a component of an XR system including additional computational components. In some examples, the head-wearable apparatus 100 is a component in an XR system comprising additional user input systems or devices.

Machine Architecture

Figure 2:
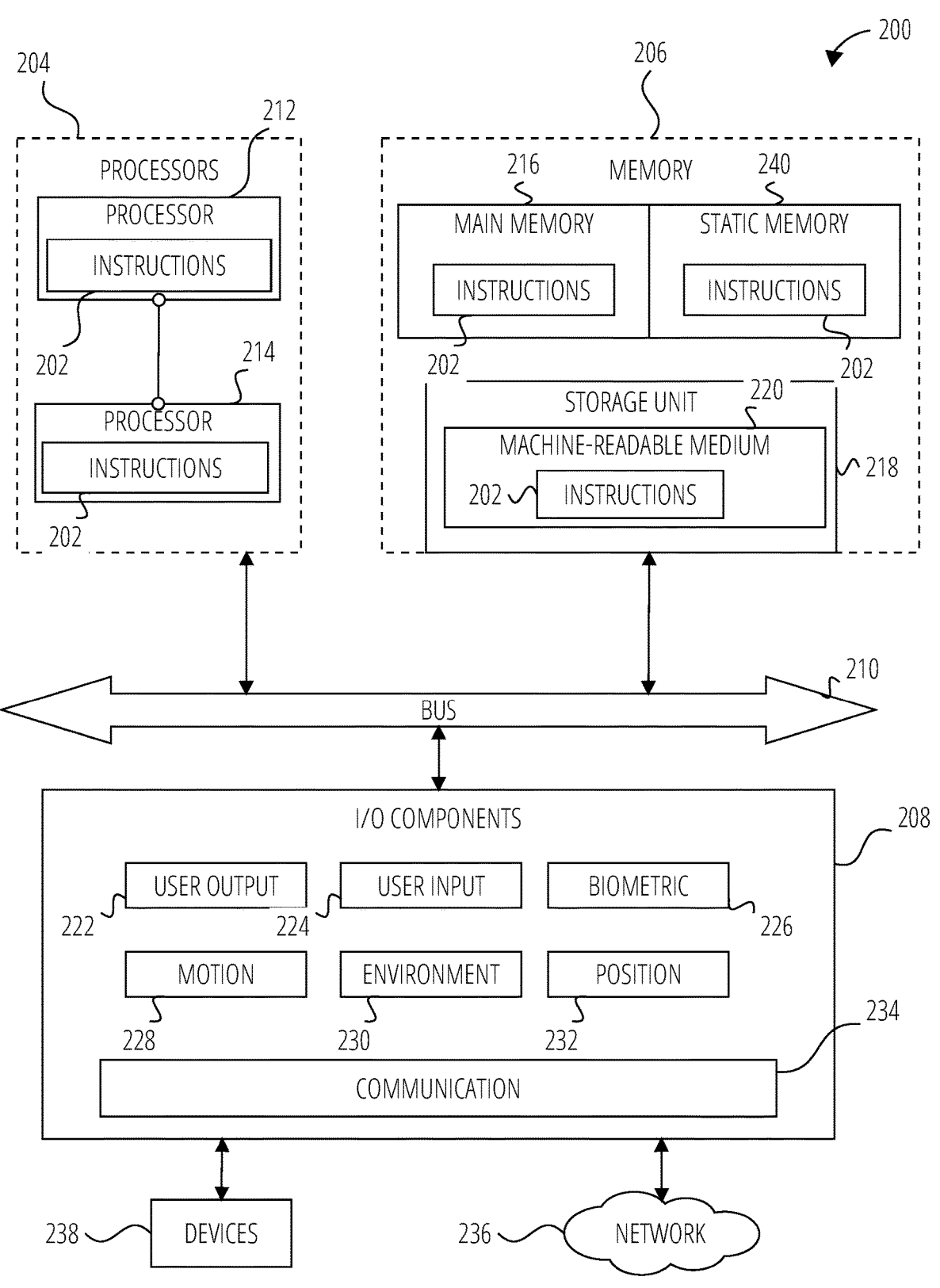
FIG. 2 is a diagrammatic representation of a machine within which a set of instructions may be executed to cause the machine to perform any one or more of the methodologies discussed herein, according to some examples.

FIG. 2 is a diagrammatic representation of the machine 200 within which instructions 202 (e.g., software, a program, an application, an applet, an app, or other executable code) for causing the machine 200 to perform any one or more of the methodologies discussed herein may be executed. For example, the instructions 202 may cause the machine 200 to execute any one or more of the methods described herein. The instructions 202 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 202, sequentially or otherwise, that specify actions to be taken by the machine 200. Further, while a single machine 200 is illustrated, the term "machine" shall also be taken to include a collection of machines that individually or jointly execute the instructions 202 to perform any one or more of the methodologies discussed herein. The machine 200, for example, may comprise the computing system 902 (of FIG. 9) or any one of multiple server devices forming part of the interaction server system 910 (of FIG. 9). In some examples, the machine 200 may also comprise both client and server systems, with certain operations of a particular method or algorithm being performed on the server-side and with certain operations of the particular method or algorithm being performed on the client-side.

The machine 200 may include processors 204, memory 206, and input/output I/O components 208, which may be configured to communicate with each other via a bus 210. In an example, the processors 204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 212 and a processor 214 that execute the instructions 202. The term "processor" is intended to include multi-core processors that may comprise two or more independent processors (sometimes referred to as "cores") that may execute instructions contemporaneously. Although FIG. 2 shows multiple processors 204, the machine 200 may include a single processor with a single-core, a single processor with multiple cores (e.g., a multi-core processor), multiple processors with a single core, multiple processors with multiples cores, or any combination thereof.

The memory 206 includes a main memory 216, a static memory 240, and a storage unit 218, both accessible to the processors 204 via the bus 210. The main memory 206, the static memory 240, and storage unit 218 store the instructions 202 embodying any one or more of the methodologies or functions described herein. The instructions 202 may also reside, completely or partially, within the main memory 216, within the static memory 240, within machine-readable medium 220 within the storage unit 218, within at least one of the processors 204 (e.g., within the processor's cache memory), or any suitable combination thereof, during execution thereof by the machine 200.

The I/O components 208 may include a wide variety of components to receive input, provide output, produce output, transmit information, exchange information, capture measurements, and so on. The specific I/O components 208 that are included in a particular machine will depend on the type of machine. For example, portable machines such as mobile phones may include a touch input device or other such input mechanisms, while a headless server machine will likely not include such a touch input device. It will be appreciated that the I/O components 208 may include many other components that are not shown in FIG. 2. In various examples, the I/O components 208 may include user output components 222 and user input components 224. The user output components 222 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 224 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 208 may include biometric components 226, motion components 228, environmental components 230, or position components 232, among a wide array of other components. For example, the biometric components 226 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 228 include acceleration sensor components (e.g., accelerometer), gravitation sensor components, rotation sensor components (e.g., gyroscope), or the like.

The environmental components 230 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

The position components 232 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 208 further include communication components 234 operable to couple the machine 200 to a network 236 or devices 238 via respective coupling or connections. For example, the communication components 234 may include a network interface component or another suitable device to interface with the network 236. In further examples, the communication components 234 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 238 may be another machine or any of a wide variety of peripheral devices (e.g., a peripheral device coupled via a USB).

Moreover, the communication components 234 may detect identifiers or include components operable to detect identifiers. For example, the communication components 234 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 234, such as location via Internet Protocol (IP) geolocation, location via Wi-Fi® signal triangulation, location via detecting an NFC beacon signal that may indicate a particular location, and so forth.

The various memories (e.g., main memory 216, static memory 240, and memory of the processors 204) and storage unit 218 may store one or more sets of instructions and data structures (e.g., software) embodying or used by any one or more of the methodologies or functions described herein. These instructions (e.g., the instructions 202), when executed by processors 204, cause various operations to implement the disclosed examples.

The instructions 202 may be transmitted or received over the network 236, using a transmission medium, via a network interface device (e.g., a network interface component included in the communication components 234) and using any one of several well-known transfer protocols (e.g., hypertext transfer protocol (HTTP)). Similarly, the instructions 202 may be transmitted or received using a transmission medium via a coupling (e.g., a peer-to-peer coupling) to the devices 238.

Figure 3A:
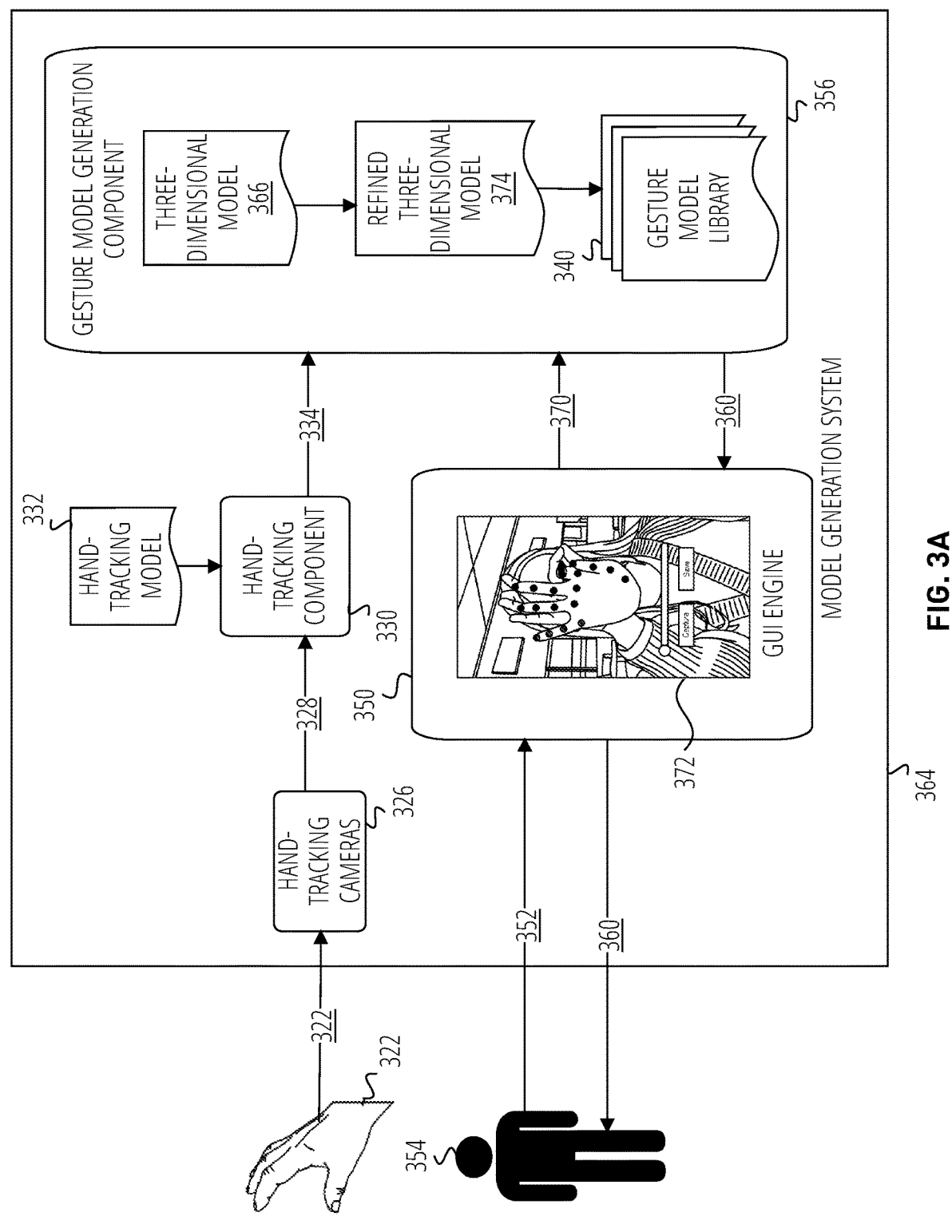
FIG. 3A is a collaboration diagram of a model generation system, according to some examples.

FIG. 3A is a collaboration diagram of a model generation system 364 and FIG. 3B is an activity diagram of a three-dimensional model refinement method 376, according to some examples. A model generation system 364 uses the three-dimensional model refinement method 376 to generate a refined three-dimensional model 374 from a three-dimensional model 366 of a gesture 322 being demonstrated by a user 354.

Although the example three-dimensional model refinement method 376 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

In operation 302, the model generation system 364 captures, using one or more cameras, hand-tracking data of a gesture made by a user demonstrating the gesture. For example, the model generation system 364 uses hand-tracking cameras 326 to capture video or image data showing the user 354 performing a gesture 322. The hand-tracking cameras 326 can comprise one or more visible light cameras that capture images or video of the user's 354 hand as they perform the gesture 322. In some examples, the hand-tracking component 330 uses a machine learning hand-tracking model 332 and the tracking image data 328 captured by the hand-tracking cameras 326 to generate the hand-tracking data 334. The hand-tracking model 332 can comprise a neural network or other machine learning model trained to analyze image data as more fully described in reference to FIG. 6 and FIG. 7. The hand-tracking component 330 uses the hand-tracking model 332 to detect a position and orientation of the user's hand, fingers, and joints. The hand-tracking component 330 feeds the tracking image data 328 into the hand-tracking model 332 which then outputs the hand-tracking data 334 comprising the detected joint positions and orientations of the user's hand as they perform the gesture 322.

In operation 304, the model generation system 364 uses a gesture model generation component 356 to generate a three-dimensional model 366 of the gesture 322 using the hand-tracking data 334. For example, the gesture model generation component 356 receives the hand-tracking data 334 and uses the hand-tracking data 334 comprising the detected joint positions and orientations of the user's 354 hand to generate a skeletal three-dimensional model 366 of the user's hand in the pose matching the performed gesture 322. The three-dimensional model 366 is generated by taking the skeletal model joint positions from the hand-tracking data 334 and constructing a model of the user's 354 hand in the gesture pose comprising vertices and edges having coordinates in a 3D coordinate system. This allows the model generation system 364 to capture the three-dimensional model 366 of the gesture 322 performed by the user 354.

In operation 306, the model generation system 364 provides a display of the three-dimensional model 366 to the user. For example, the gesture model generation component 356 generates a three-dimensional model display 360 of the three-dimensional model 366 and communicates the three-dimensional model display 360 to a Graphical User Interface (GUI) engine 350. The GUI engine 350 receives the three-dimensional model display 360 and generates an interactive model refinement GUI 372 that the user 354 can interact with. This allows the user 354 to visualize the three-dimensional model 366 of their hand in a pose matching the performed gesture 322. The GUI engine 350 can display the three-dimensional model 366 from various angles and allow the user 354 to interact with the three-dimensional model 366, such as rotating or zooming the three-dimensional model 366 to inspect how accurately the three-dimensional model 366 captures their performed gesture 322. This display on the model refinement GUI 372 provides feedback to the user 354 on how well the model generation system 364 has captured their gesture 322 and allows the user 354 to edit and refine the three-dimensional model 366.

In operation 308, the gesture model generation component 356 receives, from the user 354, model refining data 370 refining the three-dimensional model 366. For example, the gesture model generation component 356 receives user input 352 from the user 354 via a model refinement GUI 372 generated by the GUI engine 350 as model refining data 370 to capture the refinements and simplifications made to the three-dimensional model 366. The user 354 interacts with the model refinement GUI 372 to select and delete joints deemed unimportant for the gesture. The gesture model generation component 356 receives this user input 352 to remove these joints from the three-dimensional model 366. Additionally, the gesture model generation component 356 receives user input 352 as the user 354 manipulates the position and orientation of remaining joints to clarify or refine the three-dimensional model 366. In this way, the gesture model generation component 356 receives model refining data 370 from the user 354 through the model refinement GUI 372 to refine the three-dimensional model 366.

In some examples, the user 354 views the three-dimensional model 366 of their hand performing the gesture 322 through the model refinement GUI 372 generated by the GUI engine 350. The GUI engine 350 displays the three-dimensional model 366 with joints visualized as colorful spheres. Interacting with the model refinement GUI 372, the user 354 selects certain joints, such as the pinky finger joints, that are not important for recognizing the particular gesture 322. The user 354 edits the three-dimensional model 366 by deleting these selected joints using the model refinement GUI 372. This removal of joints deemed unimportant refines the three-dimensional model 366 by eliminating unnecessary vertices and edges. In some examples, a refined three-dimensional model 374 includes a reduced set of joints used to recognize the gesture 322.

In some examples, through additional interaction with the model refinement GUI 372, the user 354 can further refine the three-dimensional model 366 by manipulating the position and orientation of the remaining joints. For example, the user 354 can rotate joints or spread fingers farther apart to further refine the three-dimensional model 366 of the gesture 322.

In operation 310, the gesture model generation component 356 generates a refined three-dimensional model 374 of the gesture using the model refining data 370. For example, the gesture model generation component 356 receives user input 352 from the user 354 via the GUI engine 350 as model refining data 370 to refine the three-dimensional model 366. The gesture model generation component 356 uses this model refining data 370 to modify the three-dimensional model 366 by removing unimportant joints selected by the user 354 and manipulating the positions of remaining joints. The gesture model generation component 356 generates a refined and optimized refined three-dimensional model 374 focused on the joints and geometry used for accurate gesture recognition. In this way, the gesture model generation component 356 uses the model refining data 370 from the user 354 to generate a refined three-dimensional model 374 of the gesture 322 optimized for precision and speed of gesture recognition. In some examples, the model generation system 364 stores the refined three-dimensional model 374 in a gesture model library 340 so that the refined three-dimensional model 374 may be used to detect the gesture 322 by an XR system as more fully described in FIG. 5A and FIG. 5B.

In some examples, removing unimportant joints from the three-dimensional model 366 improves the speed and accuracy of gesture recognition by reducing potential errors caused by extraneous joints. A refined version of the three-dimensional model 366 includes the joints that define the geometry of the intended gesture. This allows using the refined three-dimensional model 374 to match the gesture 322 more precisely without variability from unimportant joints degrading the accuracy. For example, fingertips often have higher variability in their positioning and can introduce errors if included in the three-dimensional model 366. By removing unnecessary joints, the skeletal joints of the hand that remain in the refined three-dimensional model 366 define the gesture, ensuring more accurate recognition. Removing unimportant joints also speeds up the gesture recognition process by reducing the amount of processing required on each video frame. The simplified three-dimensional model 366 with fewer joints requires fewer calculations to match against, lowering the computational load. A complex model with many joints is more taxing for real-time processing. Refining the three-dimensional model 366 by removing unnecessary joints enables faster response to a user's performed gestures.

In some examples, the model generation system 364 adds modifiable parameters to a refined three-dimensional model to suggest expressiveness of the gesture. The model generation system 364 provides an interface that enables selecting additional parameters. For example, the model generation system 364 enables selecting a speed parameter to indicate if a gesture should be faster or slower. Faster speed could imply an action like kicking a ball, while slower speed could imply planning to kick. In some examples, the model generation system 364 enables selecting a precision parameter to specify if a gesture needs precise replication or can have more variability. In some examples, the model generation system 364 enables selecting a repetition parameter to indicate if a gesture should be repeated multiple times when performed.

After the user selects desired modifiable parameters, the model generation system 364 associates these parameters with the refined three-dimensional model in the gesture model library 340. When storing the refined model, the model generation system 364 includes the added modifiable parameters. In this way, the model generation system 364 provides an interface to add expressiveness parameters to a refined three-dimensional model of a gesture before storing it in the gesture model library 340.

In some examples, the gesture model generation component 356 captures, using the one or more cameras, hand-tracking data of a sequence of gestures made by the user demonstrating the sequence of gestures. The gesture model generation component 356 generates a sequence of three-dimensional models of the sequence of gestures using the hand-tracking data and provides a display of the sequence of three-dimensional models to the user in the model refinement GUI 372. The gesture model generation component 356 receives, from the user, model refining data refining the sequence of three-dimensional models and receives, from the user, instructions for detecting a start event and an end event of the sequence of gestures. The gesture model generation component 356 generates a sequence of refined three-dimensional models of the sequence of gestures using the model refining data, and stores the sequence of refined three-dimensional models and the instructions in a gesture library. The sequence of refined three-dimensional models and the instructions may then be used of for detecting the sequence of gestures. For example, the model generation component 356 can capture a sequence of gestures that comprise a more complex gesture with multiple phases. The model generation system 364 generates a three-dimensional model for each gesture in the sequence. The model generation system 364 displays the sequence of three-dimensional models to the user for refinement. The user provides model refining data to optimize each three-dimensional model in the sequence. The user also provides instructions for detecting the start and end of the overall sequence, such as when a certain refined three-dimensional model in the sequence is detected. The component then generates a refined three-dimensional model for each gesture in the sequence. The model generation system 364 stores the sequence of refined models along with the instructions in a gesture library so that they may be used to detect the overall sequence of gestures by an XR system as more fully described in FIG. 5A and FIG. 5B. In this way, the model generation system 364 can define multi-phase gestures as a sequence of refined three-dimensional models framed by a start and end event.

Figure 4:
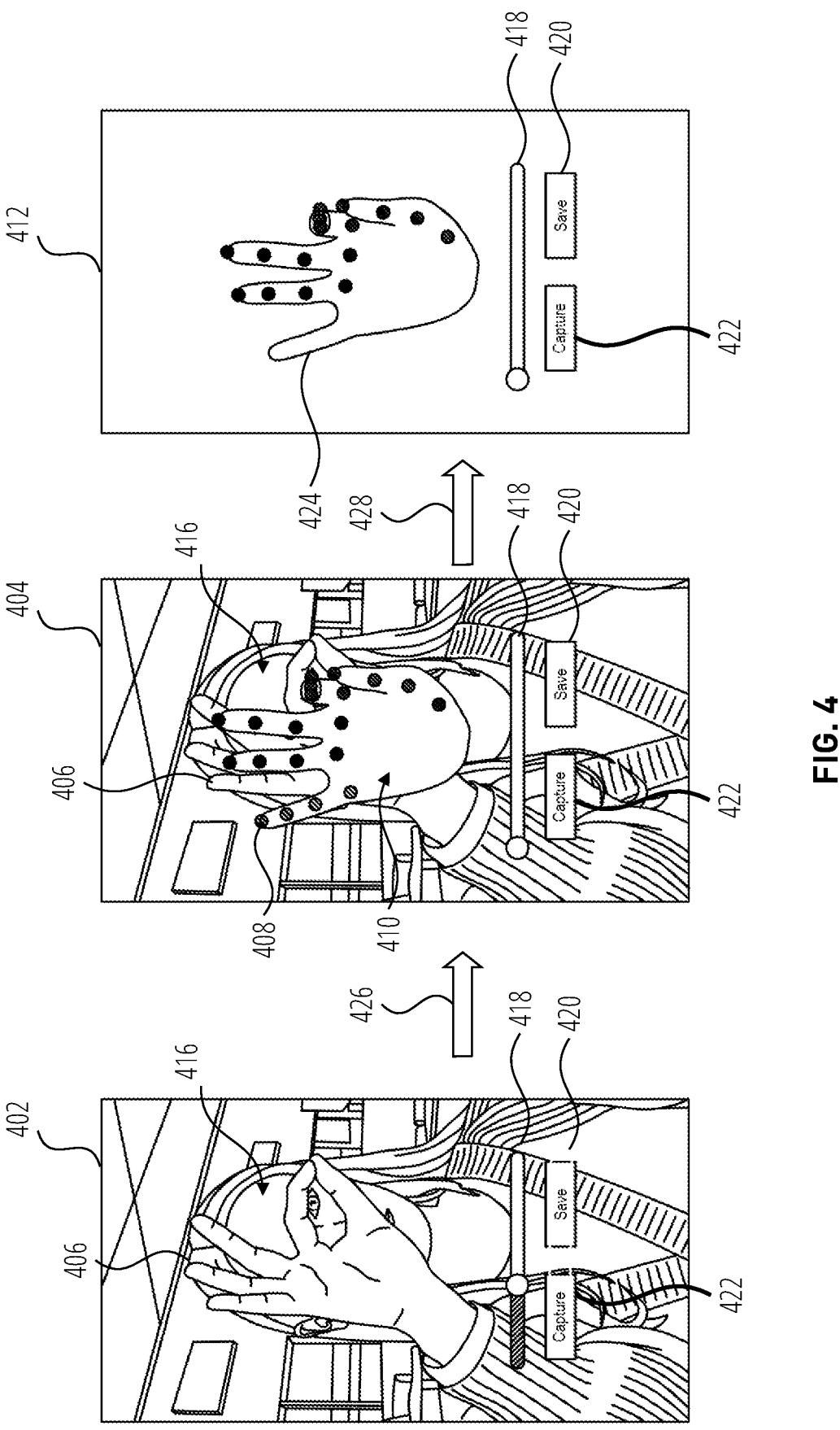
FIG. 4 illustrates a process of using a capture, display, and refinement user interfaces to capture and refine a three-dimensional model, according to some examples.

FIG. 4 illustrates a process of using a capture UI 402, a display UI 404, and a refinement UI 412 to capture and refine a three-dimensional model, according to some examples. In some examples, a model refinement GUI 372 (of FIG. 3A) includes a capture UI 402, a display UI 404, and a refinement UI 412. The user 416 interacts with the UIs to instruct a model generation system 364 (of FIG. 3A) capture and refine a three-dimensional model 410 of a gesture 406 and generate a refined three-dimensional model 424 of the gesture 406.

The user 416 user uses the capture UI 402 to instruct the model generation system 364 to capture a three-dimensional model 410 of a gesture 406 the user 416 is demonstrating. For example, the capture UI 402 may show a live video feed from a camera tracking the user's 416 hand. When the user 416 performs the desired gesture 406, they can use the capture UI 402 to select a capture selection 422 to instruct the model generation system 364 to capture the gesture 406 as the three-dimensional model 410 using a save selection 420 to capture and save the three-dimensional model 410 of the gesture 406. This allows the model generation system 364 to capture the physical hand gesture 406 as data that can be refined to generate the refined three-dimensional model 374.

The display UI 404 allows the user 416 to visually inspect 426 the captured three-dimensional model 410. The display UI 404 displays the three-dimensional model 410 on a display screen, allowing the user 416 to interact with the three-dimensional model 410, such as by rotating the three-dimensional model 410 using a rotate slider 418. In some examples, the display UI 404 includes a tilt selection selectable by the user 416 to tilt the three-dimensional model 410. In some examples, the display UI 404 includes a zoom selection selectable by the user 416 to zoom in and out on the three-dimensional model 410. The three-dimensional model 410 is displayed as a skeletal representation with vertices representing joints visualized, such as vertex 408. This allows the user 416 to see how accurately the captured three-dimensional model 410 reflects the intended gesture 406.

After inspecting the three-dimensional model 410, the user 416 can then instruct the model generation system 364 to refine 428 the model using the refinement UI 412. The refinement UI 412 provides controls allowing the user 416 to manipulate the three-dimensional model 410. For example, the user 416 can adjust the location of joints by selecting them and moving them within the refined three-dimensional model 424. The user 416 can also select certain joints or vertices and delete them. This allows the user 416 to instruct the model generation system 364 to remove unimportant joints from the three-dimensional model 410 to generate the refined three-dimensional model 424. Once the user 416 is satisfied with the refined three-dimensional model 424, the user 416 can select the save selection 420 to save the refined three-dimensional model 424. In some examples, the user 416 may instruct the model generation system 364 to recapture the gesture 406 using the capture selection 422. Through these refinement UI 412 controls, the user 416 instructs the model generation system 364 refine the three-dimensional model 410 to create a refined three-dimensional model 424 comprising a representation focused on the joints used for precision gesture recognition.

In this way, the capture UI 402, display UI 404, and refinement UI 412 allow the user 416 to capture, visualize, and refine a three-dimensional model 410 of their gesture 406 and instruct the model generation system 364 to generate a refined three-dimensional model 424 using the three-dimensional model 410. The refinement UI 412 gives the user 416 precise control over the refined three-dimensional model 424 to tailor the refined three-dimensional model 424 for accurate gesture recognition.

Figure 5A:
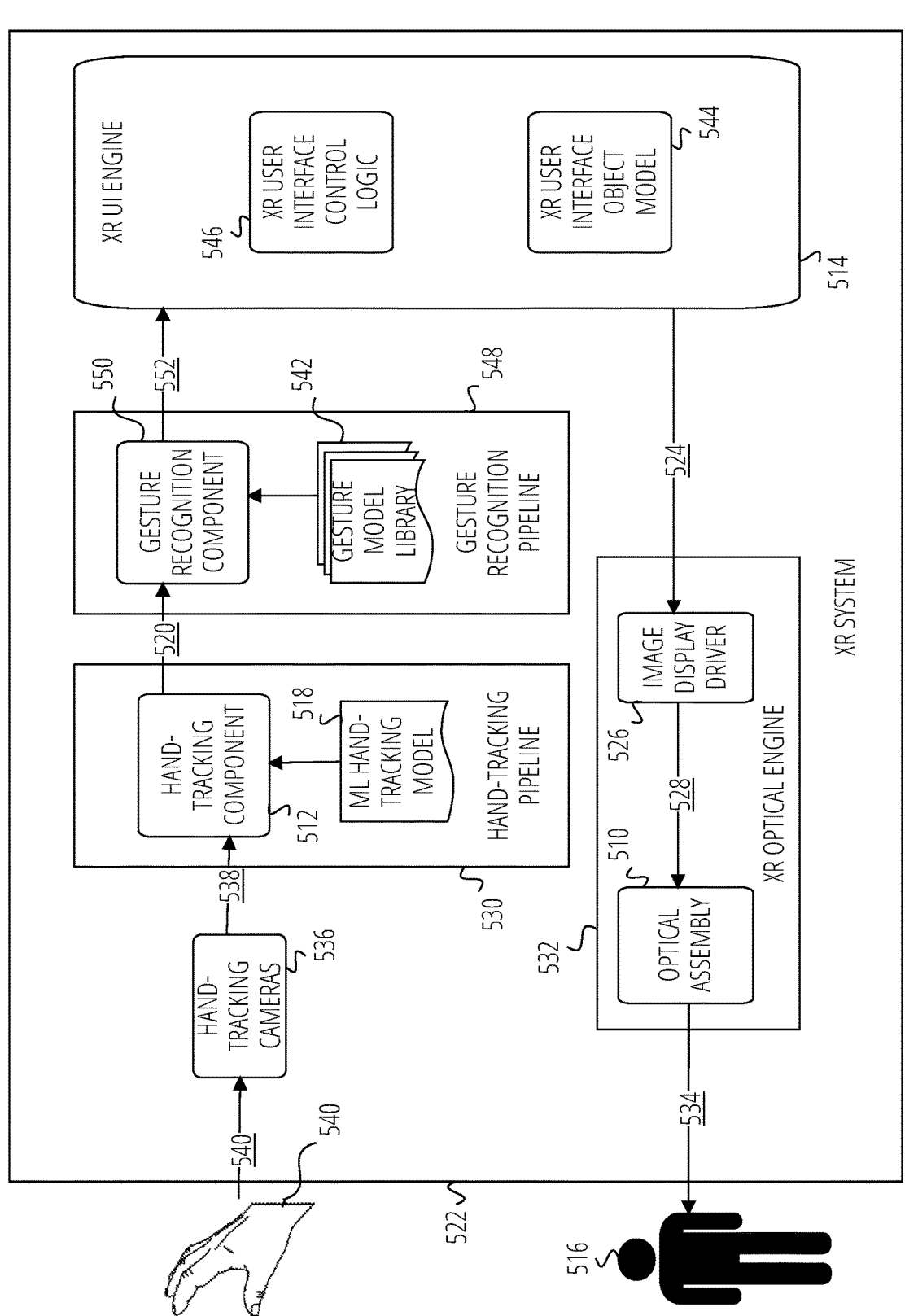
FIG. 5A is a collaboration diagram of components of an XR system using gestures for user input, according to some examples.
Figure 5B:
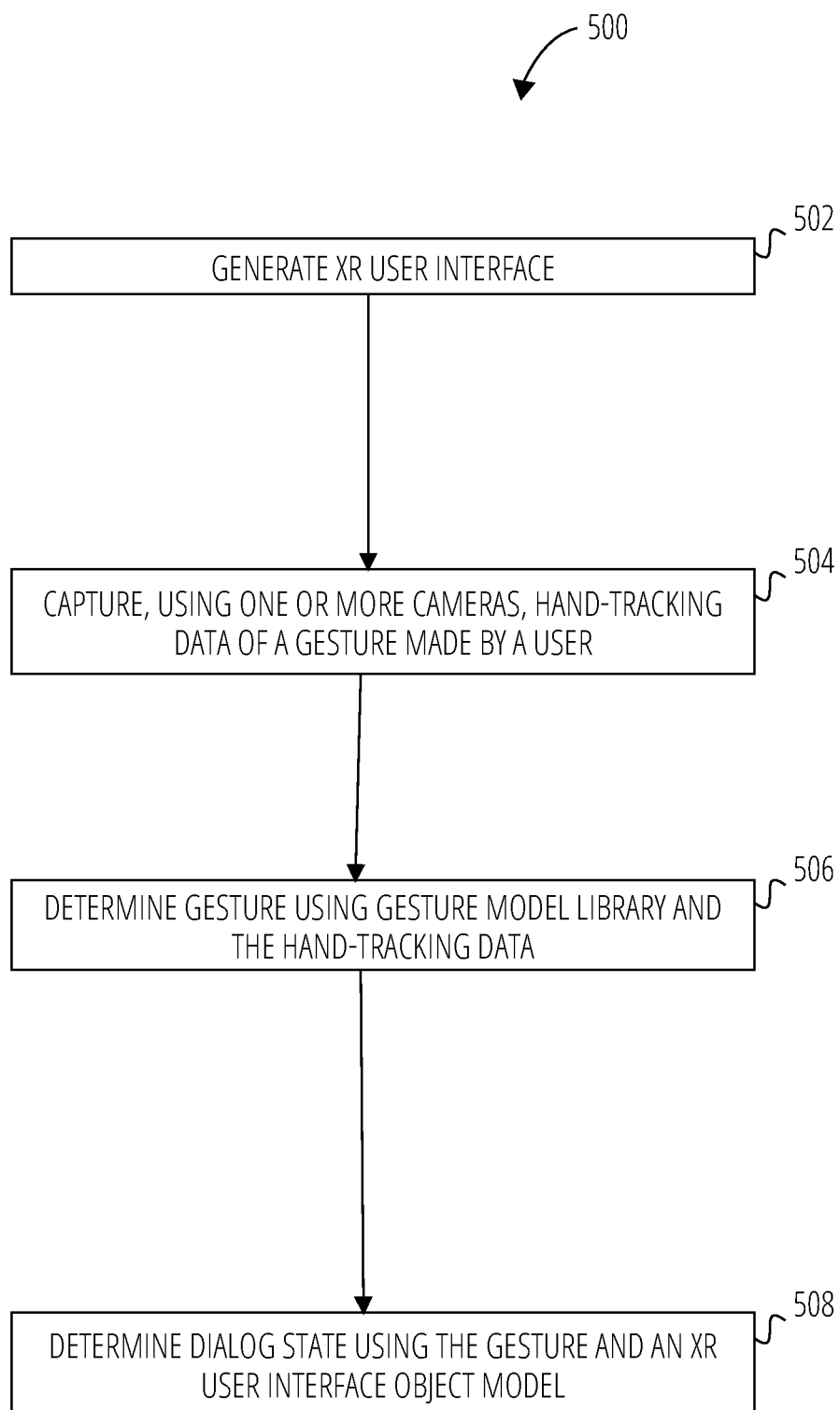
FIG. 5B is an activity diagram of method of a gesture-based XR user interface, according to some examples.

FIG. 5A illustrates a collaboration diagram of components of an XR system 522 using hand-tracking for user input, and FIG. 5B illustrates an activity diagram of a method of a gesture-based XR UI 500, according to some examples.

Although the method of a gesture-based XR UI 500 depicts a particular sequence of operations, the sequence may be altered without departing from the scope of the present disclosure. For example, some of the operations depicted may be performed in parallel, in a different sequence, or by different components of an XR system, that does not materially affect the function of the method.

The method of a gesture-based XR UI 500 is used by an XR system 522, such as head-wearable apparatus 100 (of FIG. 1A), to provide a continuous real-time input modality to a user 516 of the XR system 522 where the user 516 interacts with an XR user interface 534 using hand gestures 540 or hand poses being made by the user 516 using one or more of their hands. The XR user interface 534 may be for a useful application such as a maintenance guide, an interactive map, an interactive tour guide, a tutorial, or the like. The application may also be an entertainment application such as a video game, an interactive video, or the like.

In some examples, the XR system 522 detects gestures being made by the user 516 where the gesture is associated with virtually manipulating virtual objects of an XR user interface 534, termed Direct Manipulation of Virtual Objects (DMVO). In some examples, the gesture 540 may be a free gesture made without reference to a virtual object of the XR user interface 534.

In operation 502, the XR system 522 generates the XR user interface 534 provided to the user 516. For example, an XR UI engine 514 includes XR user interface control logic 546 comprising a dialog script or the like that specifies a user interface dialog implemented by the XR user interface 534. The XR user interface control logic 546 also includes one or more actions that are to be taken by the XR system 522 based on detecting various dialog events such as user inputs input by the user 516. The XR UI engine 514 further includes an XR user interface object model 544. The XR user interface object model 544 includes 3D coordinate data of one or more virtual objects created by the XR user interface control logic 546. The XR user interface object model 544 also includes 3D graphics data of the virtual objects of the XR user interface 534. The 3D graphics data are used by an XR optical engine 532 to generate the XR user interface 534 for display to the user 516.

The XR UI engine 514 generates XR user interface graphics data 524 using the XR user interface object model 544. The XR user interface graphics data 524 includes image data of the one or more virtual objects of the XR user interface 534. The XR UI engine 514 communicates the XR user interface graphics data 524 to an image display driver 526 of an XR optical engine 532 of the XR system 522. The image display driver 526 receives the XR user interface graphics data 524 and generates display control signals 528 using the XR user interface graphics data 524. The image display driver 526 uses the display control signals 528 to control the operations of one or more optical assemblies 510 of the XR optical engine 532. In response to the display control signals 528, the one or more optical assemblies 510 generate visible images of the XR user interface 534 that are provided to the user 516.

In operation 504, the XR system 522 captures, using one or more hand-tracking cameras 536, hand-tracking data of a gesture 540 made by the user 516. For example, the XR system 522 uses one or more hand-tracking cameras 536 to capture tracking image data 538 of one or more gestures 540 being made by the user 516 using one or more of the user's hands. The one or more hand-tracking cameras 536 communicate the tracking image data 538 to a hand-tracking component 512 of a hand-tracking pipeline 530 of the XR system 522.

The hand-tracking component 512 receives the tracking image data 538 and generates hand-tracking data 520 using the tracking image data 538. The hand-tracking data 520 includes skeletal model data of one or more skeletal models of the one or more gestures 540 of the user in a 3D coordinate system using landmark features extracted from the tracking image data 538. The skeletal models comprise skeletal model features that correspond to recognized visual landmarks of portions of the one or more hands of the user 516. In some examples, the hand-tracking data 520 includes landmark data such as landmark identification, a physical location of the landmark, links between joints of the user's fingers and categorization information of one or more landmarks associated with the one or more hands of the user 516.

In some examples, the hand-tracking component 512 extracts landmarks of the one or more hands of the user 516 from the tracking image data 538 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

Figure 7:
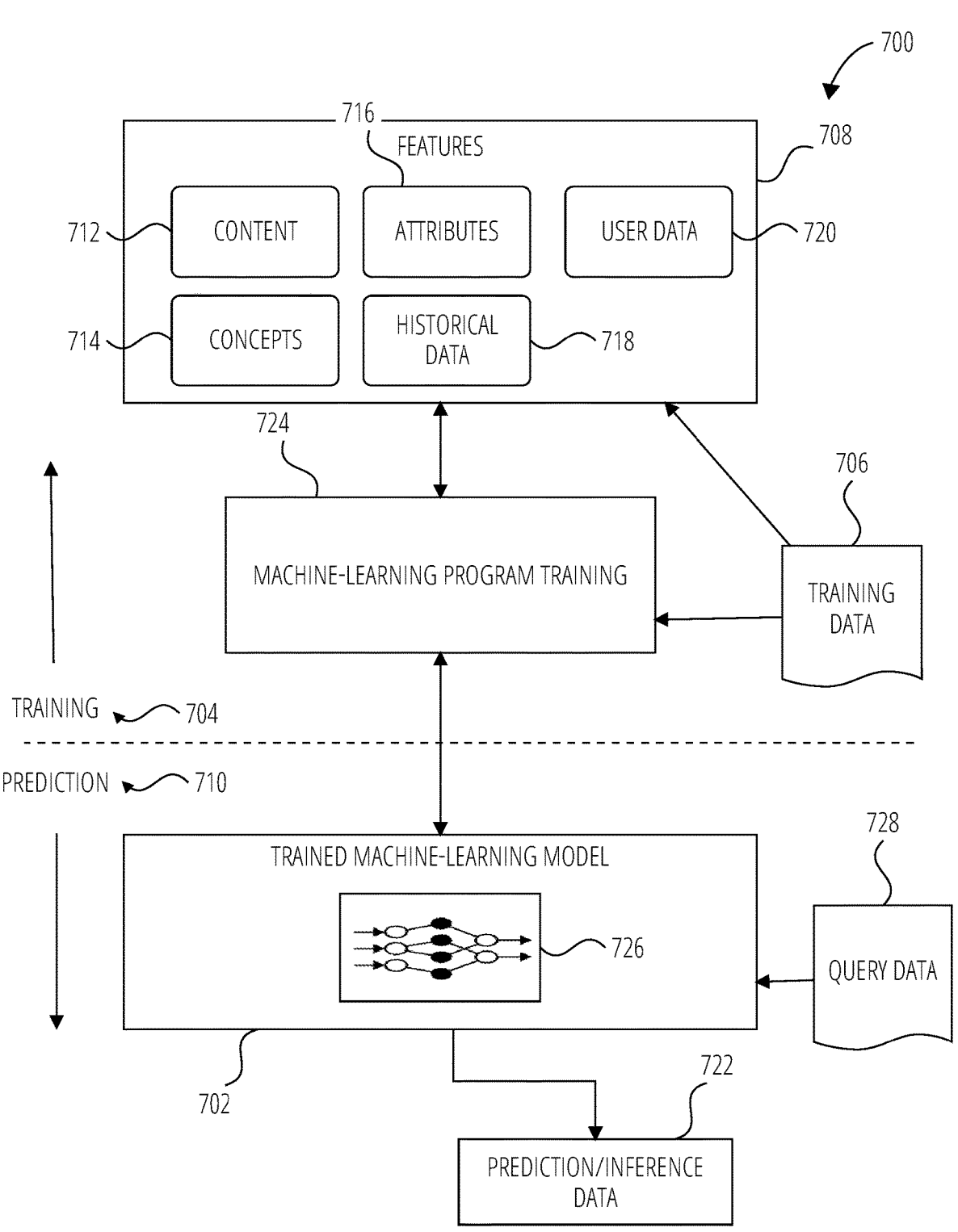
FIG. 7 illustrates training and use of a machine-learning program, according to some examples.
Figure 8:
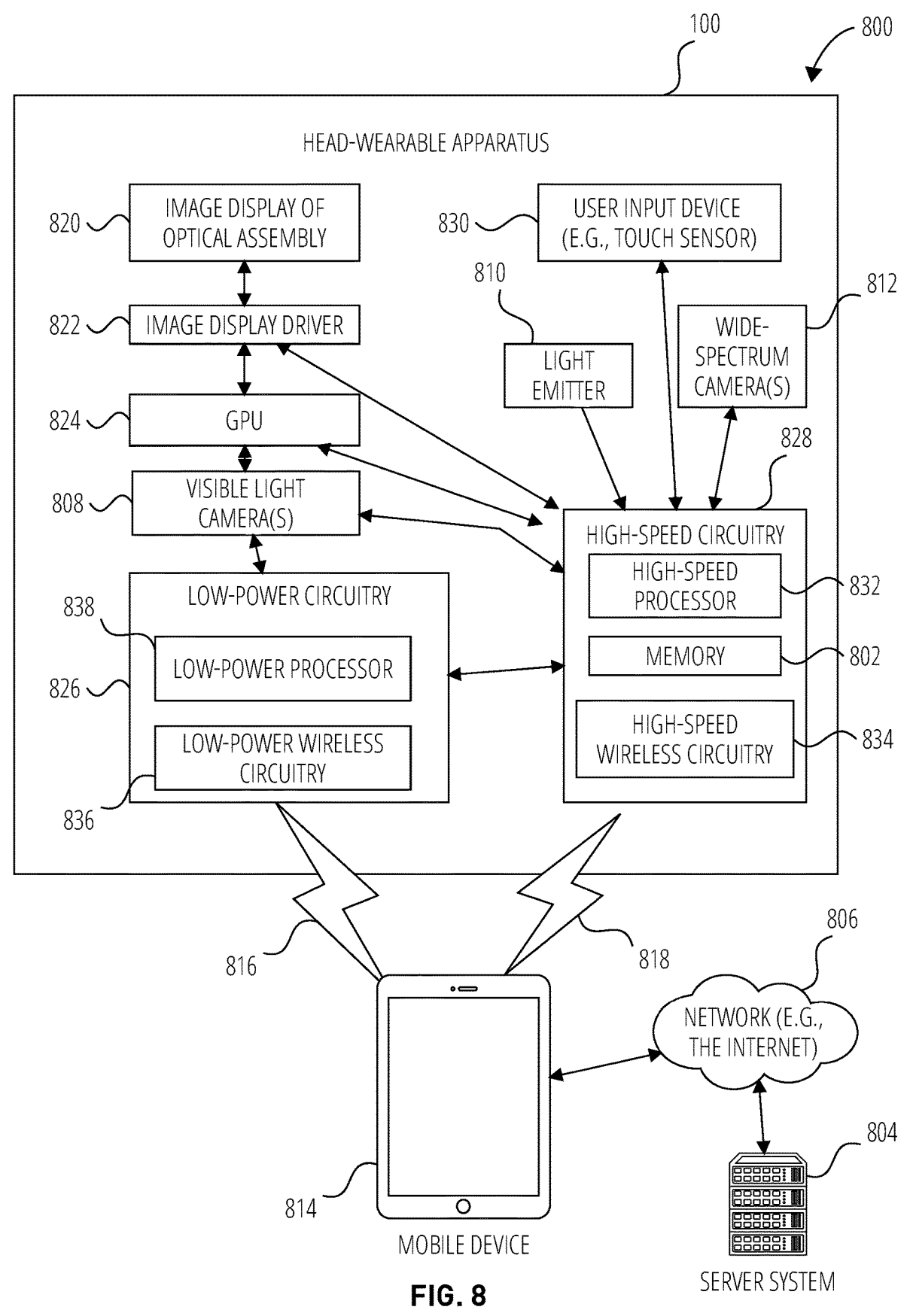
FIG. 8 illustrates a system of a head-wearable apparatus, according to some examples.

In some examples, the hand-tracking component 512 generates the hand-tracking data 520 using the landmarks extracted from the tracking image data 538, artificial intelligence methodologies, and an ML hand-tracking model 518 that was previously generated using machine learning methodologies as more fully described in reference to FIG. 7 and FIG. 8.

In some examples, the hand-tracking component 512 generates the hand-tracking data 520 using the landmarks extracted from the tracking image data 538 using geometric methodologies.

In operation 506, the XR system 522 determines a gesture being made by the user 516 using a gesture model library 542 and the hand-tracking data 520. For example, the hand-tracking component 512 of the hand-tracking pipeline 530 communicates the hand-tracking data 520 to a gesture recognition component 550 of a gesture recognition pipeline 548. The gesture recognition component 550 uses AI methodologies and a gesture model library 542 (e.g., gesture model library 340 of FIG. 3A) to determine a recognized gesture 552. In some examples, the gesture recognition component 550 analyzes the hand-tracking data 520 which contains the 3D skeletal model of the user's 516 hand performing a gesture 540. This skeletal model data includes the positions and orientations of the joints and fingertips. The gesture recognition component 550 compares these joint positions and orientations to the refined 3D models stored in the gesture model library 542. Each refined model focuses on the joint positions and orientations used to accurately recognize that gesture. When the joint positions and orientations from the hand-tracking data 520 sufficiently match one of the refined models in the gesture model library 542, within a defined tolerance, the gesture recognition component 550 determines that the recognized gesture 552 is the gesture associated with that matched refined model. For example, if the hand-tracking data 520 indicates the thumb tip and forefinger tip are within 2 cm of each other, the gesture recognition component 550 would determine the recognized gesture 552 is a pinch gesture based on matching the recognized gesture 552 to the pinch gesture refined model in the gesture model library 542.

In some examples, the gesture recognition component 550 receives the hand-tracking data 520 containing the skeletal model of the user's hand. This skeletal model includes joints and vertices in a 3D coordinate system representing the hand structure. To compare this to a refined three-dimensional model, the gesture recognition component 550 calculates a Euclidean distance between corresponding joints and vertices in the two models. For example, the distance between the thumb tip vertex in the hand-tracking skeletal model and the thumb tip vertex in the refined three-dimensional model is computed. This 3D Euclidean distance is calculated for corresponding joints and vertices between the skeletal model of the hand-tracking data 520 and the refined three-dimensional model. The smaller the overall sum of 3D Euclidean distances between the skeletal model of the hand-tracking data 520 and the refined three-dimensional model, the higher the match. The gesture recognition component 550 compares these summed distances to a threshold value to determine if the skeletal model from the hand-tracking data 520 matches a particular refined three-dimensional model in the gesture model library 542. If the skeletal model of the hand-tracking data 520 and the refined three-dimensional model these summed distances meet or exceed the threshold value, then a match is determined and the associated gesture of the matched refined three-dimensional model is output as the recognized gesture 552. In this way, 3D Euclidean distances between corresponding joints and vertices are used to geometrically match the skeletal model of the hand-tracking data 520 to a refined three-dimensional model of the gesture model library 542 for gesture recognition.

In some examples, a Euclidean distance threshold value for matching a hand-tracking skeletal model to a refined three-dimensional model is determined through training and testing. For example, a dataset containing many examples of hand-tracking data and associated performed gestures is collected. This dataset is split into a training set and a testing set. The training set is used to train the gesture recognition component 550 on matching hand-tracking data to refined gesture models at different Euclidean distance threshold values. The threshold value resulting in a gesture recognition accuracy meeting or exceeding a determined value on the training set is selected. This threshold value is then evaluated on the testing set to determine if the threshold value generalizes well to new data. The threshold value can be further tuned on the testing set to improve the accuracy of the gesture recognition component 550. In some examples, the threshold value can be set per gesture to account for differences in the variability and precision of different gestures. Through this training process, the Euclidean distance threshold values are learned for each gesture model to improve recognition accuracy while minimize false positives. In some examples, the threshold values are updated as more training data becomes available.

In some examples, the gesture model library 542 includes sequences of refined three-dimensional models of gestures along with a defined start gesture sequence event and stop gesture sequence event for each sequence. For example, a sequence for an American Sign Language word may comprise refined three-dimensional models for the individual letter gestures A-S-K sequenced together. The start gesture sequence event would be detection of the refined three-dimensional models for gesture A. The stop gesture sequence event would be detection of the refined three-dimensional models for gesture K. To recognize a sequence, the gesture recognition component 550 continuously receives the hand-tracking data 520 containing the evolving skeletal model as the user 516 performs a gesture sequence. The gesture recognition component 550 matches the skeletal models from the hand-tracking data 520 to the refined three-dimensional models in the gesture model library 542 as described previously. When the gesture recognition component 550 detects the refined model defined as the start gesture sequence event, the gesture recognition component 550 begins the sequence detection process. As the gesture sequence continues, the gesture recognition component 550 matches the gestures to the sequenced refined three-dimensional models. When the gesture recognition component 550 detects the refined three-dimensional models defined as the stop gesture sequence event, it outputs the sequence of recognized gestures 552 corresponding to the matched sequence of refined three-dimensional models from the gesture model library 542. In this way, the gesture recognition component 550 utilizes the start gesture, stop gesture, and sequenced refined models in the gesture model library 542 to detect a complete gesture sequence.

In some examples, when a refined three-dimensional model in the gesture model library 542 contains modifiable parameters, the gesture recognition component 550 factors these in during gesture recognition. For example, for a gesture with a speed parameter, the gesture recognition component 550 analyzes the velocity of the hand joints from the hand-tracking data 520. It compares the velocity to speed thresholds to determine if the velocity matches a 'fast' or 'slow' speed parameter. For example, if the velocity meets or exceeds a specified fast velocity threshold value, the gesture recognition component 550 determines that the velocity of the hand joints matches a fast parameter. If the velocity does not exceed a specified slow velocity threshold, the gesture recognition component 550 determines that velocity of the hand joints matches a slow velocity parameter.

For a gesture with a precision parameter, the gesture recognition component 550 calculates variability in the hand joint positions over time from the hand-tracking data 520. It compares the variability to a precision tolerance threshold to determine if the precision matches a 'precise' or 'imprecise' parameter. For a gesture with a repetition parameter, the gesture recognition component 550 counts the number of times the gesture is sequentially detected from the hand-tracking data 520. It compares the repetition count to a defined threshold to determine if the repetition matches a 'single' or 'multiple' parameter. After analyzing the modifiable parameters, the gesture recognition component 550 outputs the recognized gesture 552 along with the determined expressiveness based on the modifiable parameters.

In operation 508, the XR system 522 determines a dialog state using the recognized gesture 552, the XR user interface object model 544, and the XR user interface control logic 546. For example, the XR system 522 determines a dialog state of the XR user interface 534 using the recognized gesture 552 as a user input, the XR user interface object model 544 of the XR user interface 534, and the XR user interface control logic 546. In some examples, the XR UI engine 514 contains the XR user interface control logic 546 which defines the overall dialog structure, dialog states, time frames of when a gesture is to be recognized, and actions associated with the XR user interface 534. The XR user interface object model 544 includes the 3D models and coordinates of the virtual objects displayed in the XR user interface 534. When the gesture recognition component 550 recognizes a gesture from the user 516, this is output as the recognized gesture 552 to the XR UI engine 514. The XR UI engine 514 checks the current state of the XR user interface 534 dialog using the XR user interface control logic 546. The XR UI engine 514 compares the recognized gesture 552 to the actions defined in the XR user interface control logic 546 for that dialog state. In response to the recognized gesture 552 matching an action, the corresponding new dialog state defined in the XR user interface control logic 546 is transitioned to. In this way, the recognized gesture 552 acts as a user input which triggers a state change in the XR user interface 534 dialog managed by the XR user interface control logic 546. The XR user interface object model 544 is updated to reflect any changes to the virtual objects in the new dialog state. The updated XR user interface 534 is then redisplayed to the user 516 by the XR optical engine 532.

In some examples, the XR system implements non-head mounted screen-based environment. For example, gestures are used to interact with an XR mirror that is a screen-based XR interface where cameras capture images of a user facing a display and the XR system overlays interactive digital content onto the video feed in real-time, augmenting the user's reflection.

In some examples, gestures detected by the XR system are free gestures that are not associated with DMVO and may not be associated with a screen. Example applications of applications that may use free gestures include, but are not limited to:

Gesture control of robots or remote machinery: A user interface using a hand-tracking pipeline is used to control movements of robots. Operators perform gestures that are mapped to robot commands. This removes the need for haptic controls.

Sign language translation: The ability to accurately track hands and recognize complex finger and hand poses is used to detect sign language gestures. An AI system translates the identified signs into text or speech. This enables communication with the deaf community.

Automotive interfaces: Drivers use hand gestures to control secondary car systems like entertainment, navigation, climate, etc. This allows drivers to keep their eyes on the road. The gesture vocabulary could be customized per car model.

Smart appliance control: Household appliances with cameras detect gestures to control operations instead of using buttons. For example, gestures are used to start/stop a robot vacuum, change oven temp, or control lighting. In some examples, appliances use a predefined gesture language.

Gaming: Hand tracking with precise finger recognition provides new input modalities for video game experiences, beyond holding controllers. For example, users may perform gesture combos, cast spells with hand signs, or toggle options by pointing at their wrists.

Machine-Learning Pipeline

Figure 6:
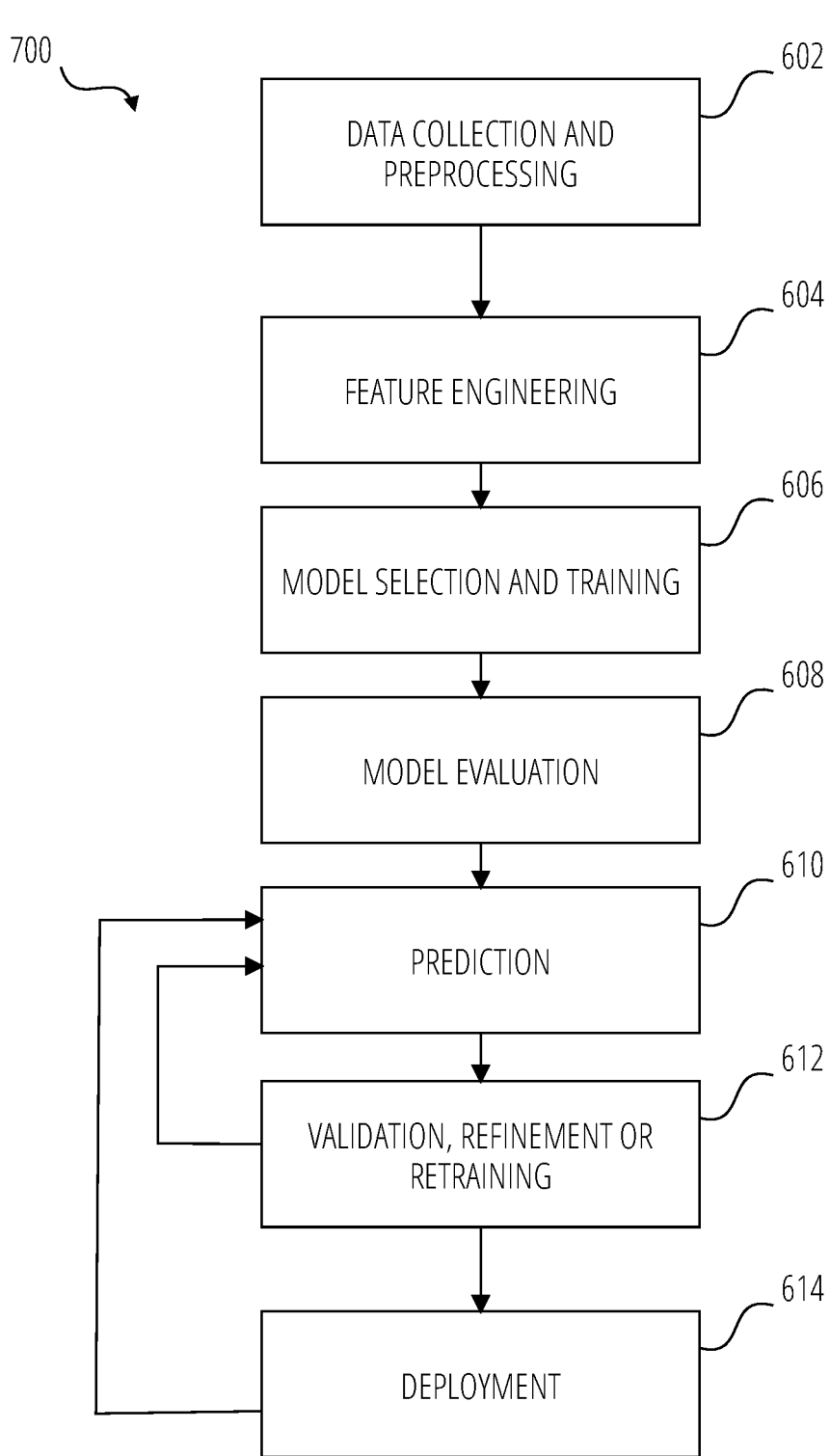
FIG. 6 illustrates a machine-learning pipeline, according to some examples.

FIG. 6 illustrates a machine-learning pipeline 700 and FIG. 7 is a flowchart depicting operations of the machine-learning pipeline 700, according to some examples. The machine-learning pipeline 700 may be used to generate a trained machine-learning model 702 (e.g., the ML hand-tracking model 518 of FIG. 5A), to perform operations associated with computer vision, recognition, searches, and query responses.

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Training Phases

Generating a trained machine-learning model 702 may include multiple phases that form part of the machine-learning pipeline 700, including for example the following phases illustrated in FIG. 6:

Data collection and preprocessing 602: This phase may include acquiring and cleaning data to ensure that it is suitable for use in the machine learning model. This phase may also include removing duplicates, handling missing values, and converting data into a suitable format.

Feature engineering 604: This phase may include selecting and transforming the training data 706 to create features that are useful for predicting the target variable. Feature engineering may include (1) receiving features 708 (e.g., as structured or labeled data in supervised learning) and/or (2) identifying features 708 (e.g., unstructured or unlabeled data for unsupervised learning) in training data 706.

Model selection and training 606: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 608: This phase may include evaluating the performance of a trained model (e.g., the trained machine-learning model 702) on a separate testing dataset. This phase can help determine if the model is overfitting or underfitting and determine whether the model is suitable for deployment.

Prediction 610: This phase involves using a trained model (e.g., trained machine-learning model 702) to generate predictions on new, unseen data.

Validation, refinement or retraining 612: This phase may include updating a model based on feedback generated from the prediction phase, such as new data or user feedback.

Deployment 614: This phase may include integrating the trained model (e.g., the trained machine-learning model 702) into a more extensive system or application, such as a web service, mobile app, or IoT device. This phase can involve setting up APIs, building a user interface, and ensuring that the model is scalable and can handle large volumes of data.

FIG. 7 illustrates further details of two example phases, namely a training phase 704 (e.g., part of the model selection and trainings 606) and a prediction phase 710 (part of prediction 610). Prior to the training phase 704, feature engineering 604 is used to identify features 708. This may include identifying informative, discriminating, and independent features for effectively operating the trained machine-learning model 702 in pattern recognition, classification, and regression. In some examples, the training data 706 includes labeled data, known for pre-identified features 708 and one or more outcomes. Each of the features 708 may be a variable or attribute, such as an individual measurable property of a process, article, system, or phenomenon represented by a data set (e.g., the training data 706). Features 708 may also be of different types, such as numeric features, strings, and graphs, and may include one or more of content 712, concepts 714, attributes 716, historical data 718, and/or user data 720, merely for example.

In training phase 704, the machine-learning pipeline 700 uses the training data 706 to find correlations among the features 708 that affect a predicted outcome or prediction/inference data 722.

With the training data 706 and the identified features 708, the trained machine-learning model 702 is trained during the training phase 704 during machine-learning program training 724. The machine-learning program training 724 appraises values of the features 708 as they correlate to the training data 706. The result of the training is the trained machine-learning model 702 (e.g., a trained or learned model).

Further, the training phase 704 may involve machine learning, in which the training data 706 is structured (e.g., labeled during preprocessing operations). The trained machine-learning model 702 implements a neural network 726 capable of performing, for example, classification and clustering operations. In other examples, the training phase 704 may involve deep learning, in which the training data 706 is unstructured, and the trained machine-learning model 702 implements a deep neural network 726 that can perform both feature extraction and classification/clustering operations.

In some examples, a neural network 726 may be generated during the training phase 704, and implemented within the trained machine-learning model 702. The neural network 726 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 726 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 726 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 704, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 710, the trained machine-learning model 702 uses the features 708 for analyzing query data 728 to generate inferences, outcomes, or predictions, as examples of a prediction/inference data 722. For example, during prediction phase 710, the trained machine-learning model 702 generates an output. Query data 728 is provided as an input to the trained machine-learning model 702, and the trained machine-learning model 702 generates the prediction/inference data 722 as output, responsive to receipt of the query data 728.

In some examples, the trained machine-learning model 702 may be a generative AI model. Generative AI is a term that may refer to any type of artificial intelligence that can create new content from training data 706. For example, generative AI can produce text, images, video, audio, code, or synthetic data similar to the original data but not identical.

Some of the techniques that may be used in generative AI are:

Convolutional Neural Networks (CNNs): CNNs may be used for image recognition and computer vision tasks. CNNs may, for example, be designed to extract features from images by using filters or kernels that scan the input image and highlight important patterns.

Recurrent Neural Networks (RNNs): RNNs may be used for processing sequential data, such as speech, text, and time series data, for example. RNNs employ feedback loops that allow them to capture temporal dependencies and remember past inputs.

Generative adversarial networks (GANs): GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

In generative AI examples, the query data 728 may include text, audio, image, video, numeric, or media content prompts and the output prediction/inference data 722 includes text, images, video, audio, code, or synthetic data. System with Head-Wearable Apparatus FIG. 8 illustrates a system 800 including a head-wearable apparatus, such as head-wearable apparatus 100 of FIG. 1A, with a selector input device, according to some examples.

Figure 9:
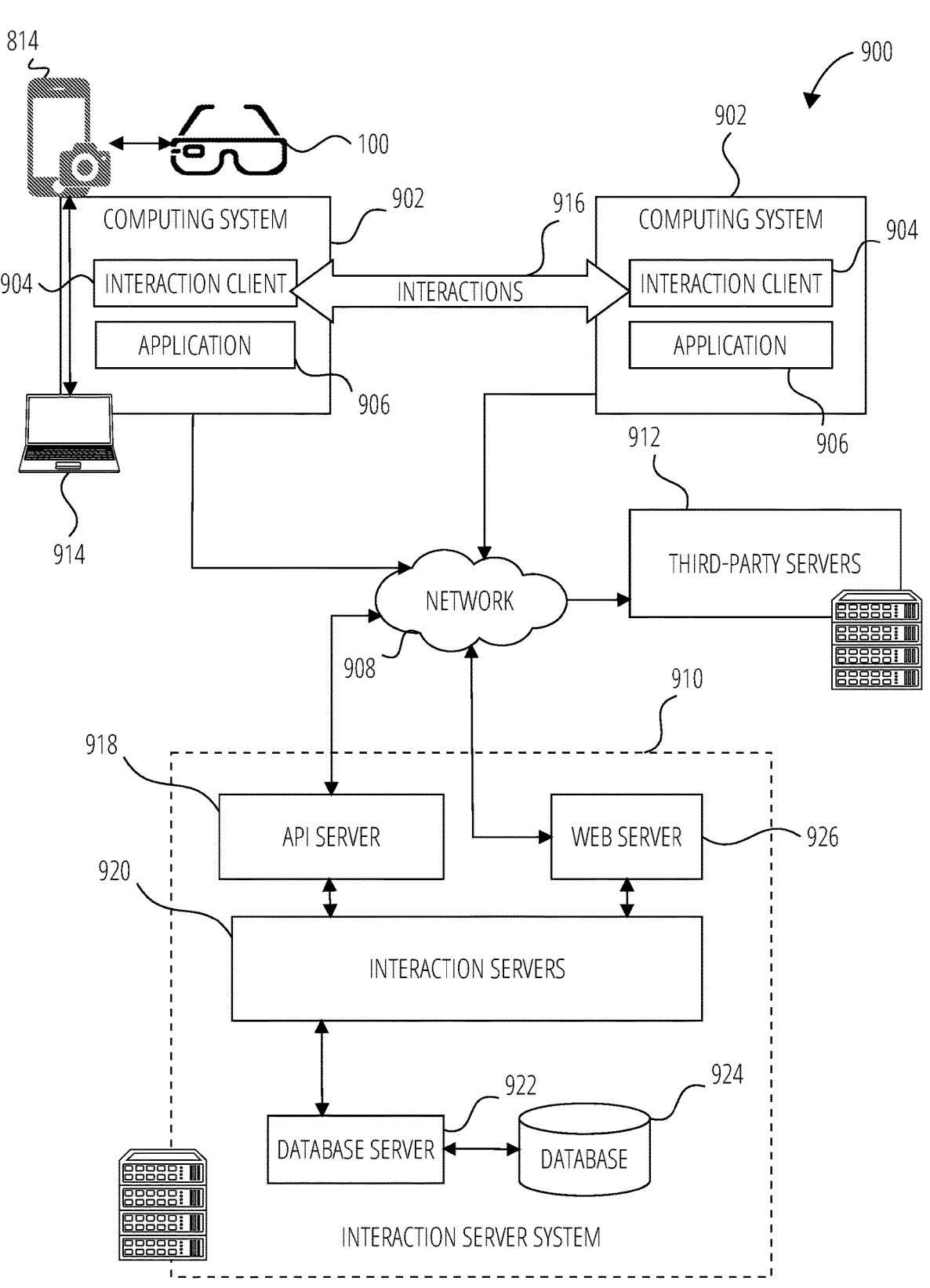
FIG. 9 is a diagrammatic representation of a networked environment in which the present disclosure may be deployed, according to some examples.

FIG. 8 is a high-level functional block diagram of an example head-wearable apparatus 100 communicatively coupled to a mobile device 814 and various server systems 804 (e.g., the interaction server system 910 of FIG. 9) via various networks 908 (of FIG. 9).

The head-wearable apparatus 100 includes one or more cameras, each of which may be, for example, one or more cameras 808, a light emitter 810, and one or more wide-spectrum cameras 812.

The mobile device 814 connects with head-wearable apparatus 100 using both a low-power wireless connection 816 and a high-speed wireless connection 818. The mobile device 814 is also connected to the server system 804 and the network 806.

The head-wearable apparatus 100 further includes two image displays of the image display of optical assembly 820. The two image displays of optical assembly 820 include one associated with the left lateral side and one associated with the right lateral side of the head-wearable apparatus 100. The head-wearable apparatus 100 also includes an image display driver 822, and a GPU 824. The image display of optical assembly 820, image display driver 822, and GPU 824 constitute an optical engine of the head-wearable apparatus 100. The image display of optical assembly 820 is for presenting images and videos, including an image that can include a graphical user interface to a user of the head-wearable apparatus 100.

The image display driver 822 commands and controls the image display of optical assembly 820. The image display driver 822 may deliver image data directly to the image display of optical assembly 820 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 830 (e.g., touch sensor or push button), including an input surface on the head-wearable apparatus 100. The user input device 830 (e.g., touch sensor or push button) is to receive from the user an input selection to manipulate the graphical user interface of the presented image.

The components shown in FIG. 8 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 808 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 802, which stores instructions to perform a subset or all of the functions described herein. The memory 802 can also include storage device.

As shown in FIG. 8, the high-speed circuitry 828 includes a high-speed processor 832, a memory 802, and high-speed wireless circuitry 834. In some examples, the image display driver 822 is coupled to the high-speed circuitry 828 and operated by the high-speed processor 832 in order to drive the left and right image displays of the image display of optical assembly 820. The high-speed processor 832 may be any processor capable of managing high-speed communications and operation of any general computing system needed for the head-wearable apparatus 100. The high-speed processor 832 includes processing resources needed for managing high-speed data transfers on a high-speed wireless connection 818 to a wireless local area network (WLAN) using the high-speed wireless circuitry 834. In certain examples, the high-speed processor 832 executes an operating system such as a LINUX operating system or other such operating system of the head-wearable apparatus 100, and the operating system is stored in the memory 802 for execution. In addition to any other responsibilities, the high-speed processor 832 executing a software architecture for the head-wearable apparatus 100 is used to manage data transfers with high-speed wireless circuitry 834. In certain examples, the high-speed wireless circuitry 834 is configured to implement Institute of Electrical and Electronic Engineers (IEEE) 802.11 communication standards, also referred to herein as WiFi. In some examples, other high-speed communications standards may be implemented by the high-speed wireless circuitry 834.

The low-power wireless circuitry 836 and the high-speed wireless circuitry 834 of the head-wearable apparatus 100 can include short-range transceivers (Bluetooth™) and wireless wide, local, or wide area network transceivers (e.g., cellular or WiFi). Mobile device 814, including the transceivers communicating via the low-power wireless connection 816 and the high-speed wireless connection 818, may be implemented using details of the architecture of the head-wearable apparatus 100, as can other elements of the network 806.

The memory 802 includes any storage device capable of storing various data and applications, including, among other things, camera data generated by the left and right cameras 808, the wide-spectrum cameras 812, and the GPU 824, as well as images generated for display by the image display driver 822 on the image displays of the image display of optical assembly 820. While the memory 802 is shown as integrated with high-speed circuitry 828, in some examples, the memory 802 may be an independent stand-alone element of the head-wearable apparatus 100. In certain such examples, electrical routing lines may provide a connection through a chip that includes the high-speed processor 832 from the GPU 824 or the low-power processor 838 to the memory 802. In some examples, the high-speed processor 832 may manage addressing of the memory 802 such that the low-power processor 838 will boot the high-speed processor 832 any time that a read or write operation involving memory 802 is needed.

As shown in FIG. 8, the low-power processor 838 or high-speed processor 832 of the head-wearable apparatus 100 can be coupled to the camera (camera 808, light emitter 810, or wide-spectrum cameras 812), the image display driver 822, the user input device 830 (e.g., touch sensor or push button), and the memory 802.

The head-wearable apparatus 100 is connected to a host computer. For example, the head-wearable apparatus 100 is paired with the mobile device 814 via the high-speed wireless connection 818 or connected to the server system 804 via the network 806. The server system 804 may be one or more computing devices as part of a service or network computing system, for example, that includes a processor, a memory, and network communication interface to communicate over the network 806 with the mobile device 814 and the head-wearable apparatus 100.

The mobile device 814 includes a processor and a network communication interface coupled to the processor. The network communication interface allows for communication over the network 806, low-power wireless connection 816, or high-speed wireless connection 818. Mobile device 814 can further store at least portions of the instructions for generating binaural audio content in the mobile device 814's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 822. The output components of the head-wearable apparatus 100 further include acoustic components (e.g., speakers), haptic components (e.g., a vibratory motor), other signal generators, and so forth. The input components of the head-wearable apparatus 100, the mobile device 814, and server system 804, such as the user input device 830, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 816 and high-speed wireless connection 818 from the mobile device 814 via the low-power wireless circuitry 836 or high-speed wireless circuitry 834.

Networked Computing Environment

FIG. 9 is a block diagram showing an example interaction system 900 for facilitating interactions (e.g., exchanging text messages, conducting text audio and video calls, or playing games) over a network. The interaction system 900 includes multiple XR systems 902, each of which hosts multiple applications, including an interaction client 904 and other applications 906. Each interaction client 904 is communicatively coupled, via one or more communication networks including a network 908 (e.g., the Internet), to other instances of the interaction client 904 (e.g., hosted on respective other XR systems 902), an interaction server system 910 and third-party servers 912). An interaction client 904 can also communicate with locally hosted applications 906 using Applications Program Interfaces (APIs).

Each computing system 902 may comprise one or more user devices, such as a mobile device 814, head-wearable apparatus 100, and a computer client device 914 that are communicatively connected to exchange data and messages.

An interaction client 904 interacts with other interaction clients 904 and with the interaction server system 910 via the network 908. The data exchanged between the interaction clients 904 (e.g., interactions 916) and between the interaction clients 904 and the interaction server system 910 includes functions (e.g., commands to invoke functions) and payload data (e.g., text, audio, video, or other multimedia data).

The interaction server system 910 provides server-side functionality via the network 908 to the interaction clients 904. While certain functions of the interaction system 900 are described herein as being performed by either an interaction client 904 or by the interaction server system 910, the location of certain functionality either within the interaction client 904 or the interaction server system 910 may be a design choice. For example, it may be technically preferable to initially deploy particular technology and functionality within the interaction server system 910 but to later migrate this technology and functionality to the interaction client 904 where a computing system 902 has sufficient processing capacity.

The interaction server system 910 supports various services and operations that are provided to the interaction clients 904. Such operations include transmitting data to, receiving data from, and processing data generated by the interaction clients 904. This data may include message content, client device information, geolocation information, media augmentation and overlays, message content persistence conditions, social network information, and live event information. Data exchanges within the interaction system 900 are invoked and controlled through functions available via user interfaces (UIs) of the interaction clients 904.

Turning now specifically to the interaction server system 910, an API server 918 is coupled to and provides programmatic interfaces to interaction servers 920, making the functions of the interaction servers 920 accessible to interaction clients 904, other applications 906 and third-party server 912. The interaction servers 920 are communicatively coupled to a database server 922, facilitating access to a database 924 that stores data associated with interactions processed by the interaction servers 920. Similarly, a web server 926 is coupled to the interaction servers 920 and provides web-based interfaces to the interaction servers 920. To this end, the web server 926 processes incoming network requests over the Hypertext Transfer Protocol (HTTP) and several other related protocols.

The API server 918 receives and transmits interaction data (e.g., commands and message payloads) between the interaction servers 920 and the XR systems 902 (and, for example, interaction clients 904 and other application 906) and the third-party server 912. Specifically, the API server 918 provides a set of interfaces (e.g., routines and protocols)

that can be called or queried by the interaction client 904 and other applications 906 to invoke functionality of the interaction servers 920. The API server 918 exposes various functions supported by the interaction servers 920, including account registration; login functionality; the sending of interaction data, via the interaction servers 920, from a particular interaction client 904 to another interaction client 904; the communication of media files (e.g., images or video) from an interaction client 904 to the interaction servers 920; the settings of a collection of media data (e.g., a story); the retrieval of a list of friends of a user of a computing system 902; the retrieval of messages and content; the addition and deletion of entities (e.g., friends) to an entity graph (e.g., a social graph); the location of friends within a social graph; and opening an application event (e.g., relating to the interaction client 904).

The interaction servers 920 host multiple systems and subsystems, described below with reference to FIG. 11.

Returning to the interaction client 904, features and functions of an external resource (e.g., a linked application 906 or applet) are made available to a user via an interface of the interaction client 904. In this context, "external" refers to the fact that the application 906 or applet is external to the interaction client 904. The external resource is often provided by a third party but may also be provided by the creator or provider of the interaction client 904. The interaction client 904 receives a user selection of an option to launch or access features of such an external resource. The external resource may be the application 906 installed on the computing system 902 (e.g., a "native app"), or a small-scale version of the application (e.g., an "applet") that is hosted on the computing system 902 or remote of the computing system 902 (e.g., on third-party servers 912). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 904. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 904 determines whether the selected external resource is a web-based external resource or a locally-installed application 906. In some cases, applications 906 that are locally installed on the computing system 902 can be launched independently of and separately from the interaction client 904, such as by selecting an icon corresponding to the application 906 on a home screen of the computing system 902. Small-scale versions of such applications can be launched or accessed via the interaction client 904 and, in some examples, no or limited portions of the small-scale application can be accessed outside of the interaction client 904. The small-scale application can be launched by the interaction client 904 receiving, from a third-party server 912 for example, a markup-language document associated with the small-scale application and processing such a document.

In response to determining that the external resource is a locally-installed application 906, the interaction client 904 instructs the computing system 902 to launch the external resource by executing locally-stored code corresponding to the external resource. In response to determining that the external resource is a web-based resource, the interaction client 904 communicates with the third-party servers 912 (for example) to obtain a markup-language document corresponding to the selected external resource. The interaction client 904 then processes the obtained markup-language document to present the web-based external resource within a user interface of the interaction client 904.

The interaction client 904 can notify a user of the computing system 902, or other users related to such a user (e.g., "friends"), of activity taking place in one or more external resources. For example, the interaction client 904 can provide participants in a conversation (e.g., a chat session) in the interaction client 904 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 904, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 904. The external resource can selectively include different media items in the responses, based on a current context of the external resource.

The interaction client 904 can present a list of the available external resources (e.g., applications 906 or applets) to a user to launch or access a given external resource. This list can be presented in a context-sensitive menu. For example, the icons representing different ones of the application 906 (or applets) can vary based on how the menu is launched by the user (e.g., from a conversation interface or from a non-conversation interface).

Data Architecture

Figure 10:
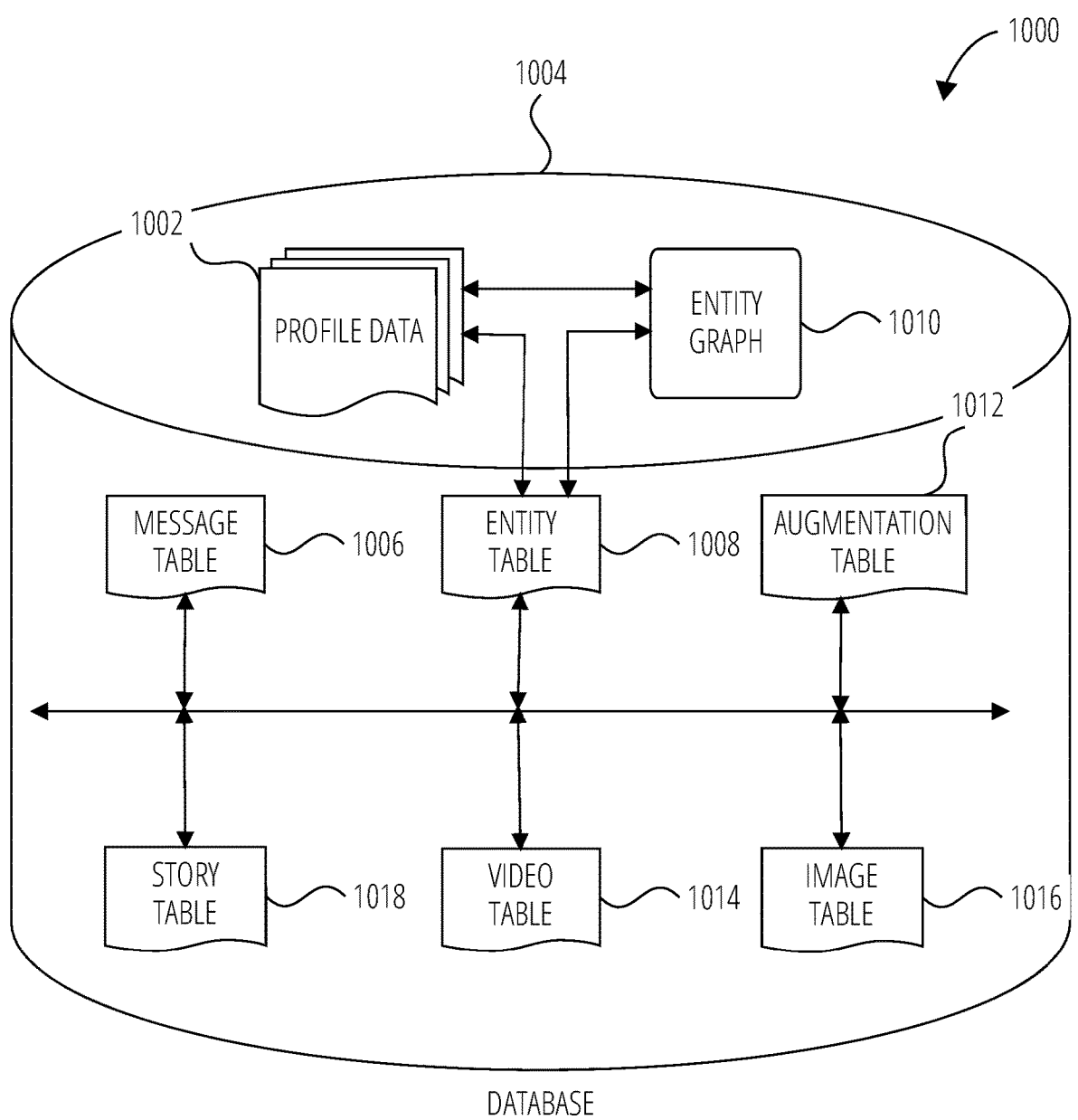
FIG. 10 is a diagrammatic representation of a data structure as maintained in a database, according to some examples.

FIG. 10 is a schematic diagram illustrating data structures 1000, which may be stored in the database 1004 of the interaction server system 910, according to certain examples. While the content of the database 1004 is shown to comprise multiple tables, it will be appreciated that the data could be stored in other types of data structures (e.g., as an object-oriented database).

The database 1004 includes message data stored within a message table 1006. This message data includes, for any particular message, at least message sender data, message recipient (or receiver) data, and a payload. Further details regarding information that may be included in a message, and included within the message data stored in the message table 1006, are described below with reference to FIG. 11.

An entity table 1008 stores entity data, and is linked (e.g., referentially) to an entity graph 1010 and profile data 1002. Entities for which records are maintained within the entity table 1008 may include individuals, corporate entities, organizations, objects, places, events, and so forth. Regardless of entity type, any entity regarding which the interaction server system 910 stores data may be a recognized entity. Each entity is provided with a unique identifier, as well as an entity type identifier (not shown).

The entity graph 1010 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 900.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 1008. Such privacy settings may be applied to all types of relationships within the context of the interaction system 900, or may selectively be applied to only certain types of relationships.

The profile data 1002 stores multiple types of profile data about a particular entity. The profile data 1002 may be selectively used and presented to other users of the interaction system 900 based on privacy settings specified by a particular entity. Where the entity is an individual, the profile data 1002 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 900, and on map interfaces displayed by interaction clients 904 to other users. The collection of avatar representations may include "status avatars," which present a graphical representation of a status or activity that the user may select to communicate at a particular time.

Where the entity is a group, the profile data 1002 for the group may similarly include one or more avatar representations associated with the group, in addition to the group name, members, and various settings (e.g., notifications) for the relevant group.

The database 1004 also stores augmentation data, such as overlays or filters, in an augmentation table 1012. The augmentation data is associated with and applied to videos (for which data is stored in a video table 1014) and images (for which data is stored in an image table 1016).

Filters, in some examples, are overlays that are displayed as overlaid on an image or video during presentation to a message receiver. Filters may be of various types, including user-selected filters from a set of filters presented to a message sender by the interaction client 904 when the message sender is composing a message. Other types of filters include geolocation filters (also known as geo-filters), which may be presented to a message sender based on geographic location. For example, geolocation filters specific to a neighborhood or special location may be presented within a user interface by the interaction client 904, based on geolocation information determined by a Global Positioning System (GPS) unit of the computing system 902.

Another type of filter is a data filter, which may be selectively presented to a message sender by the interaction client 904 based on other inputs or information gathered by the computing system 902 during the message creation process. Examples of data filters include current temperature at a specific location, a current speed at which a message sender is traveling, battery life for a computing system 902, or the current time.

Other augmentation data that may be stored within the image table 1016 includes augmented reality content items (e.g., corresponding to applying Lenses or augmented reality experiences). An augmented reality content item may be a real-time special effect and sound that may be added to an image or a video.

As described above, augmentation data includes AR, VR, and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 902 and then displayed on a screen of the computing system 902 with the modifications. This also includes modifications to stored content, such as video clips in a collection or group that may be modified. For example, in a computing system 902 with access to multiple augmented reality content items, a user can use a single video clip with multiple augmented reality content items to see how the different augmented reality content items will modify the stored clip. Similarly, real-time video capture may use modifications to show how video images currently being captured by sensors of a computing system 902 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind.

For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 902) and perform complex image manipulations locally on the computing system 902 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 902.

In some examples, a computer animation model to transform image data can be used by a system where a user may capture an image or video stream of the user (e.g., a selfie) using the computing system 902 having a neural network operating as part of an interaction client 904 operating on the computing system 902. The transformation system operating within the interaction client 904 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 902 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 1018 stores data regarding collections of messages and associated image, video, or audio data, which are compiled into a collection (e.g., a story or a gallery). The creation of a particular collection may be initiated by a particular user (e.g., each user for which a record is maintained in the entity table 1008). A user may create a "personal story" in the form of a collection of content that has been created and sent/broadcast by that user. To this end, the user interface of the interaction client 904 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 904, to contribute content to a particular live story. The live story may be identified to the user by the interaction client 904, based on his or her location. The end result is a "live story" told from a community perspective.

A further type of content collection is known as a "location story," which enables a user whose computing system 902 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 1014 stores video data that, in some examples, is associated with messages for which records are maintained within the message table 1006. Similarly, the image table 1016 stores image data associated with messages for which message data is stored in the entity table 1008. The entity table 1008 may associate various augmentations from the augmentation table 1012 with various images and videos stored in the image table 1016 and the video table 1014.

The databases 1004 also includes social network information collected by the social network system 1122.

System Architecture

Figure 11:
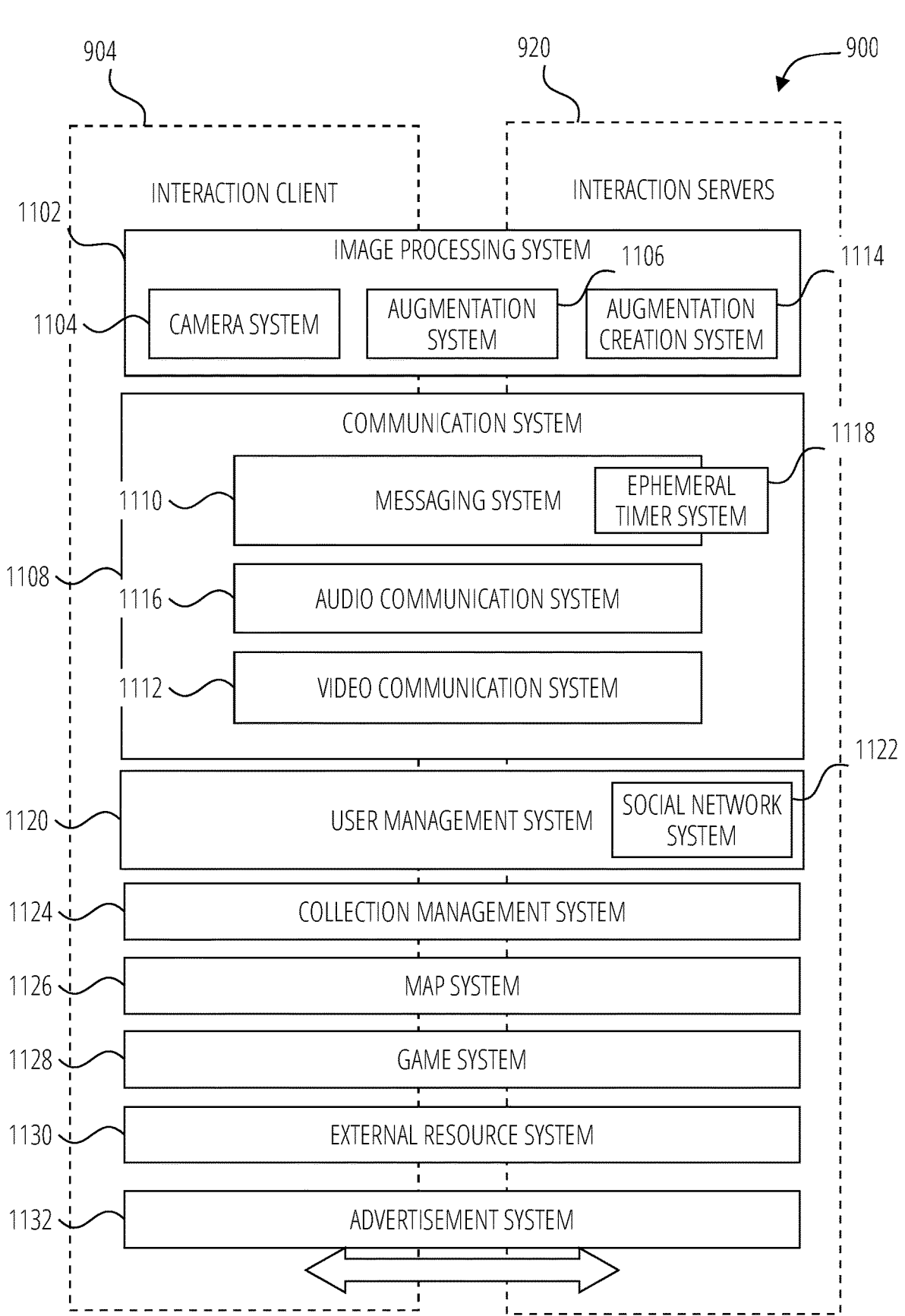
FIG. 11 is a diagrammatic representation of a messaging system that has both client-side and server-side functionality, according to some examples.

FIG. 11 is a block diagram illustrating further details regarding the interaction system 900, according to some examples. Specifically, the interaction system 900 is shown to comprise the interaction client 904 and the interaction servers 920. The interaction system 900 embodies multiple subsystems, which are supported on the client-side by the interaction client 904 and on the server-side by the interaction servers 920. Example subsystems are discussed below.

An image processing system 1102 provides various functions that enable a user to capture and augment (e.g., augment or otherwise modify or edit) media content associated with a message.

A camera system 1104 includes control software (e.g., in a camera application) that interacts with and controls hardware camera hardware (e.g., directly or via operating system controls) of the computing system 902 to modify and augment real-time images captured and displayed via the interaction client 904.

The augmentation system 1106 provides functions related to the generation and publishing of augmentations (e.g., media overlays) for images captured in real-time by cameras of the computing system 902 or retrieved from memory of the computing system 902. For example, the augmentation system 1106 operatively selects, presents, and displays media overlays (e.g., an image filter or an image lens) to the interaction client 904 for the augmentation of real-time images received via the camera system 1104 or stored images retrieved from memory 802 of a computing system 902. These augmentations are selected by the augmentation system 1106 and presented to a user of an interaction client 904, based on a number of inputs and data, such as for example:

Geolocation of the computing system 902; and

Social network information of the user of the computing system 902.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 902 for communication in a message, or applied to video content, such as a video content stream or feed transmitted from an interaction client 904. As such, the image processing system 1102 may interact with, and support, the various subsystems of the communication system 1108, such as the messaging system 1110 and the video communication system 1112.

A media overlay may include text or image data that can be overlaid on top of a photograph taken by the computing system 902 or a video stream produced by the computing system 902. In some examples, the media overlay may be a location overlay (e.g., Venice beach), a name of a live event, or a name of a merchant overlay (e.g., Beach Coffee House). In further examples, the image processing system 1102 uses the geolocation of the computing system 902 to identify a media overlay that includes the name of a merchant at the geolocation of the computing system 902. The media overlay may include other indicia associated with the merchant. The media overlays may be stored in the databases 924 and accessed through the database server 922.

The image processing system 1102 provides a user-based publication platform that enables users to select a geolocation on a map and upload content associated with the selected geolocation. The user may also specify circumstances under which a particular media overlay should be offered to other users. The image processing system 1102 generates a media overlay that includes the uploaded content and associates the uploaded content with the selected geolocation.

The augmentation creation system 1114 supports augmented reality developer platforms and includes an application for content creators (e.g., artists and developers) to create and publish augmentations (e.g., augmented reality experiences) of the interaction client 904. The augmentation creation system 1114 provides a library of built-in features and tools to content creators including, for example custom shaders, tracking technology, and templates.

In some examples, the augmentation creation system 1114 provides a merchant-based publication platform that enables merchants to select a particular augmentation associated with a geolocation via a bidding process. For example, the augmentation creation system 1114 associates a media overlay of the highest bidding merchant with a corresponding geolocation for a predefined amount of time.

A communication system 1108 is responsible for enabling and processing multiple forms of communication and interaction within the interaction system 900 and includes a messaging system 1110, an audio communication system 1116, and a video communication system 1112. The messaging system 1110 is responsible for enforcing the temporary or time-limited access to content by the interaction clients 904. The messaging system 1110 incorporates multiple timers (e.g., within an ephemeral timer system 1118) that, based on duration and display parameters associated with a message or collection of messages (e.g., a story), selectively enable access (e.g., for presentation and display) to messages and associated content via the interaction client 904. Further details regarding the operation of the ephemeral timer system 1118 are provided below. The audio communication system 1116 enables and supports audio communications (e.g., real-time audio chat) between multiple interaction clients 904. Similarly, the video communication system 1112 enables and supports video communications (e.g., real-time video chat) between multiple interaction clients 904.

A user management system 1120 is operationally responsible for the management of user data and profiles, and includes a social network system 1122 that maintains social network information regarding relationships between users of the interaction system 900.

A collection management system 1124 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 1124 may also be responsible for publishing an icon that provides notification of a particular collection to the user interface of the interaction client 904. The collection management system 1124 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1124 employs machine vision (or image recognition technology) and content rules to curate a content collection automatically. In certain examples, compensation may be paid to a user to include user-generated content into a collection. In such cases, the collection management system 1124 operates to automatically make payments to such users to use their content.

A map system 1126 provides various geographic location functions and supports the presentation of map-based media content and messages by the interaction client 904. For example, the map system 1126 enables the display of user icons or avatars (e.g., stored in profile data 1002) on a map to indicate a current or past location of "friends" of a user, as well as media content (e.g., collections of messages including photographs and videos) generated by such friends, within the context of a map. For example, a message posted by a user to the interaction system 900 from a specific geographic location may be displayed within the context of a map at that particular location to "friends" of a specific user on a map interface of the interaction client 904. A user can furthermore share his or her location and status information (e.g., using an appropriate status avatar) with other users of the interaction system 900 via the interaction client 904, with this location and status information being similarly displayed within the context of a map interface of the interaction client 904 to selected users.

A game system 1128 provides various gaming functions within the context of the interaction client 904. The interaction client 904 provides a game interface providing a list of available games that can be launched by a user within the context of the interaction client 904 and played with other users of the interaction system 900. The interaction system 900 further enables a particular user to invite other users to participate in the play of a specific game by issuing invitations to such other users from the interaction client 904. The interaction client 904 also supports audio, video, and text messaging (e.g., chats) within the context of gameplay, provides a leaderboard for the games, and also supports the provision of in-game rewards (e.g., coins and items).

An external resource system 1130 provides an interface for the interaction client 904 to communicate with remote servers (e.g., third-party servers 912) to launch or access external resources, i.e., applications or applets. Each third-party server 912 hosts, for example, a markup language (e.g., HTML5) based application or a small-scale version of an application (e.g., game, utility, payment, or ride-sharing application). The interaction client 904 may launch a web-based resource (e.g., application) by accessing the HTML5 file from the third-party servers 912 associated with the web-based resource. Applications hosted by third-party servers 912 are programmed in JavaScript leveraging a Software Development Kit (SDK) provided by the interaction servers 920. The SDK includes Application Programming Interfaces (APIs) with functions that can be called or invoked by the web-based application. The interaction servers 920 host a JavaScript library that provides a given external resource access to specific user data of the interaction client 904. HTML5 is an example of technology for programming games, but applications and resources programmed based on other technologies can be used.

To integrate the functions of the SDK into the web-based resource, the SDK is downloaded by the third-party server 912 from the interaction servers 920 or is otherwise received by the third-party server 912. Once downloaded or received, the SDK is included as part of the application code of a web-based external resource. The code of the web-based resource can then call or invoke certain functions of the SDK to integrate features of the interaction client 904 into the web-based resource.

The SDK stored on the interaction server system 910 effectively provides the bridge between an external resource (e.g., applications 906 or applets) and the interaction client 904. This gives the user a seamless experience of communicating with other users on the interaction client 904 while also preserving the look and feel of the interaction client 904. To bridge communications between an external resource and an interaction client 904, the SDK facilitates communication between third-party servers 912 and the interaction client 904. A Web ViewJavaScriptBridge running on a computing system 902 establishes two one-way communication channels between an external resource and the interaction client 904. Messages are sent between the external resource and the interaction client 904 via these communication channels asynchronously. Each SDK function invocation is sent as a message and callback. Each SDK function is implemented by constructing a unique callback identifier and sending a message with that callback identifier.

By using the SDK, not all information from the interaction client 904 is shared with third-party servers 912. The SDK limits which information is shared based on the needs of the external resource. Each third-party server 912 provides an HTML5 file corresponding to the web-based external resource to interaction servers 920. The interaction servers 920 can add a visual representation (such as a box art or other graphic) of the web-based external resource in the interaction client 904. Once the user selects the visual representation or instructs the interaction client 904 through a GUI of the interaction client 904 to access features of the web-based external resource, the interaction client 904 obtains the HTML5 file and instantiates the resources to access the features of the web-based external resource.

The interaction client 904 presents a graphical user interface (e.g., a landing page or title screen) for an external resource. During, before, or after presenting the landing page or title screen, the interaction client 904 determines whether the launched external resource has been previously authorized to access user data of the interaction client 904. In response to determining that the launched external resource has been previously authorized to access user data of the interaction client 904, the interaction client 904 presents another graphical user interface of the external resource that includes functions and features of the external resource. In response to determining that the launched external resource has not been previously authorized to access user data of the interaction client 904, after a threshold period of time (e.g., 3 seconds) of displaying the landing page or title screen of the external resource, the interaction client 904 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 904 adds the external resource to a list of authorized external resources and allows the external resource to access user data from the interaction client 904. The external resource is authorized by the interaction client 904 to access the user data under an OAuth 2 framework.

The interaction client 904 controls the type of user data that is shared with external resources based on the type of external resource being authorized. For example, external resources that include full-scale applications (e.g., an application 906) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1132 operationally enables the purchasing of advertisements by third parties for presentation to end-users via the interaction clients 904 and also handles the delivery and presentation of these advertisements.

Software Architecture

Figure 12:
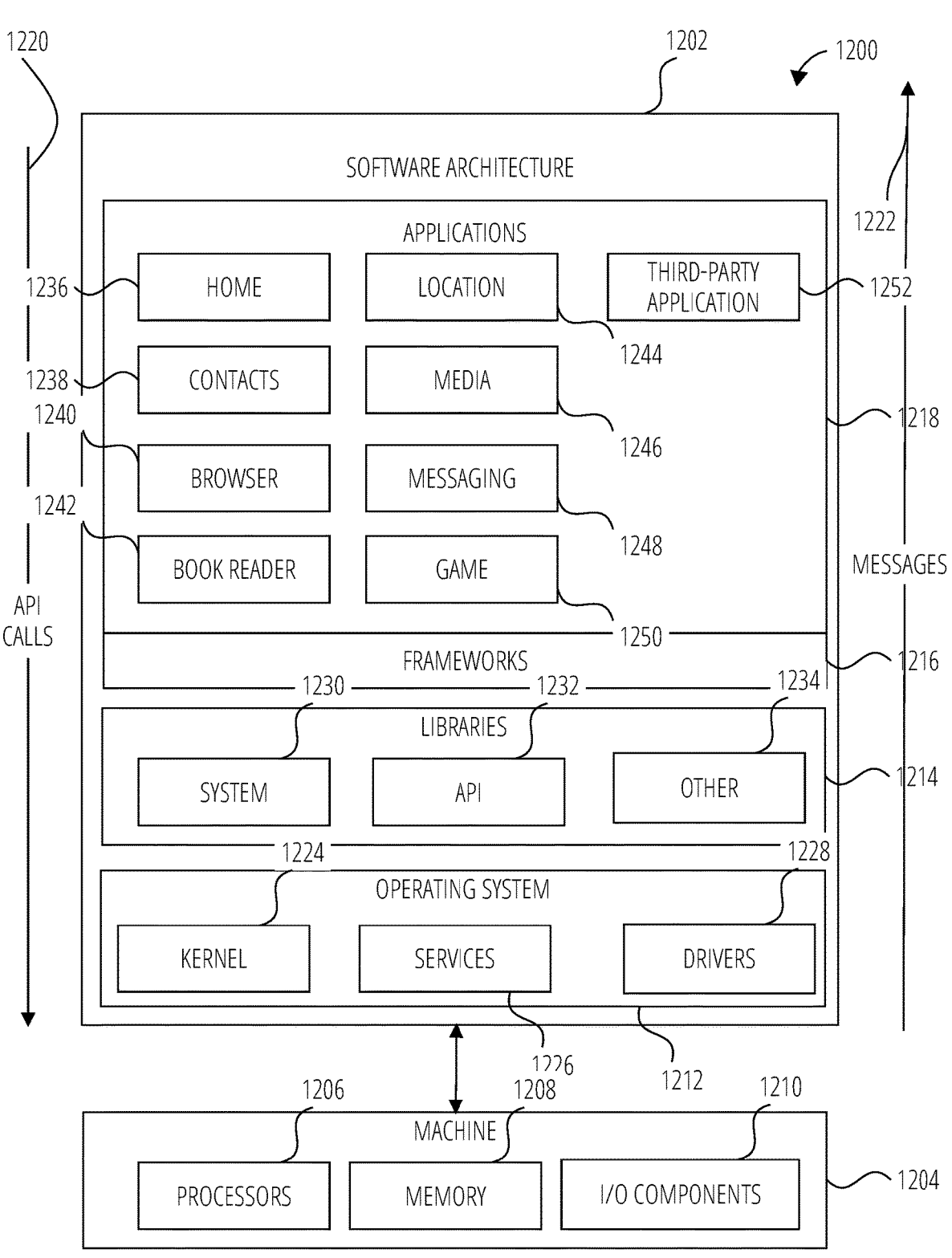
FIG. 12 is a block diagram showing a software architecture, according to some examples.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218.

Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various GUI functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

Additional examples include:

Example 1 is a method comprising: providing, by at least one processor, an XR user interface of an XR system, the XR user interface comprising a virtual object displayed to a user; detecting, by the at least one processor, a first selection location of a pinch gesture being made by the user; detecting, by the at least one processor, a translation of the first selection location to a second selection location; generating, by the at least one processor, a rotated virtual object by rotating the virtual object using the first selection location and the second selection location; and displaying, by the at least one processor, the rotated virtual object to the user in the XR user interface.

In Example 2, the subject matter of Example 1 includes, wherein detecting a selection location includes: capturing, by the at least on processor, using one or more cameras of the XR system, tracking image data; determining, by the at least one processor, hand-tracking data using the tracking image data; and determining, by the at least one processor, the selection location using the hand-tracking data.

In Example 3, the subject matter of any of Examples 1 to 2 includes, wherein determining the first selection location using the hand-tracking data includes: generating, by the at least one processor, a rotate collider of the virtual object; generating, by the at least one processor, a selection location collider using skeletal model data of the hand-tracking data; and detecting, by the at least one processors, a collision between the selection location collider and the rotate collider.

In Example 4, the subject matter of any of Examples 1-3 includes, wherein rotating the virtual object includes: generating a first selection location vector using the first selection location and a virtual object center point of the virtual object; generating a second selection location vector using the second selection location and the virtual object center point of the virtual object; and rotating the virtual object using the first selection location vector and the second selection location vector.

In Example 5, the subject matter of any of Examples 1-4 includes, rotating the virtual object using the first selection location vector and the second selection location vector includes: determining a rotation angle using the first selection location vector and the second selection location vector; and rotating the virtual object using the rotation angle and an orientation vector of the virtual object.

In Example 6, the subject matter of any of Examples 1-5 includes, detecting, by the at least one processor, that the pinch gesture is still being held by the user after redisplaying the rotated virtual object; in response to detecting that the pinch gesture is still being held, continuing, by the at least one processor, to rotate the virtual object using the pinch gesture.

In Example 7, the subject matter of any of Examples 1-6 includes, wherein the XR system includes a head-wearable apparatus.

Example 8 is at least one machine-readable medium including instructions that, when executed by processing circuitry, cause the processing circuitry to perform operations to implement of any of Examples 1-7.

Example 9 is an apparatus comprising means to implement of any of Examples 1-7.

Example 10 is a system to implement of any of Examples 1-7.

Example 11 is a method to implement of any of Examples 1-7.

Additional examples include:

Example 1 is a method of one or more processors, the method comprising: capturing, by the one or more processors, using one or more cameras, hand-tracking data of a gesture made by a user demonstrating the gesture; generating, by the one or more processors, a three-dimensional model of the gesture using the hand-tracking data; providing, by the one or more processors, a display of the three-dimensional model to the user; receiving, by the one or more processors, from the user, model refining data refining the three-dimensional model; generating, by the one or more processors, a refined three-dimensional model of the gesture using the model refining data and the three-dimensional model.

In Example 2, the subject matter of Example 1 includes, wherein the gesture data comprises joint position data.

In Example 3, the subject matter of any of Examples 1-2 includes, wherein the hand-tracking data comprises video data.

In Example 4, the subject matter of any of Examples 1-3 includes, wherein generating the three-dimensional model comprises generating a model of the user's hand.

In Example 5, the subject matter of any of Examples 1-4 includes, wherein providing the display comprises displaying the three-dimensional model on a graphical user interface.

In Example 6, the subject matter of any of Examples 1-5 includes, wherein receiving model refining data comprises receiving selections of joints to remove from the model.

In Example 7, the subject matter of any of Examples 1-6 includes, wherein receiving model refining data comprises receiving manipulated positions of joints.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:

capturing, by one or more processors, using one or more cameras, hand-tracking data of a gesture made by a user demonstrating the gesture;

generating, by the one or more processors, a three-dimensional model of the gesture using the hand-tracking data, the three-dimensional model of the gesture including a skeletal model of a hand of the user, the skeletal model comprising a plurality of skeletal model joints, each skeletal model joint of the plurality of skeletal model joints comprising a vertex in a three-dimensional coordinate system;

providing, by the one or more processors, a display of the three-dimensional model of the gesture to the user;

receiving, by the one or more processors, from the user, a selection of one or more selected skeletal model joints selected from the one or more skeletal model joints of the three-dimensional model of the gesture the one or more selected skeletal model joints selected for removal from the skeletal model to simplify the three-dimensional model;

receiving, by the one or more processors, from the user, model refining data refining the three-dimensional model, the model refining data including the one or more selected skeletal model joints of the three-dimensional model of the gesture;

generating, by the one or more processors, a refined three-dimensional model of the gesture using the model refining data and the three-dimensional model of the gesture by removing the one or more skeletal model joints selected by the user from the three-dimensional model of the gesture to simplify the skeletal model;

receiving, by the one or more processors, from the user, a modifiable parameter for the refined three-dimensional model of the gesture, the modifiable parameter comprising a repetition parameter to indicate the gesture should be repeated multiple times when performed; and associating, by the one or more processors, the modifiable parameter with the refined three-dimensional model of the gesture in a gesture model library.

2. The computer-implemented method of claim 1, wherein the gesture data comprises joint position data.

3. The computer-implemented method of claim 1, wherein the hand-tracking data comprises video data.

4. The computer-implemented method of claim 1, wherein providing the display comprises displaying the three-dimensional model on a graphical user interface.

5. The computer-implemented method of claim 1, wherein receiving model refining data comprises receiving one or more manipulated positions of the one or more joints.

6. A machine comprising:

one or more processors; and at least one memory storing instructions that, when executed by the one or more processors, cause the machine to perform operations comprising:

capturing, using one or more cameras, hand-tracking data of a gesture made by a user demonstrating the gesture;

generating a three-dimensional model of the gesture using the hand-tracking data, the three-dimensional model of the gesture including a skeletal model of a hand of the user, the skeletal model comprising a plurality of skeletal model joints, each skeletal model joint of the plurality of skeletal model joints comprising a vertex in a three-dimensional coordinate system;

providing a display of the three-dimensional model of the gesture to the user;

receiving, from the user, a selection of one or more selected skeletal model joints selected from the plurality of skeletal model joints of the three-dimensional model of the gesture, the one or more selected skeletal model joints selected for removal from the skeletal model to simplify the three-dimensional model;

receiving from the user, model refining data refining the three-dimensional model, the model refining data including the one or more selected skeletal model joints of the three-dimensional model of the gesture;

generating a refined three-dimensional model of the gesture using the model refining data and the three-dimensional model of the gesture by removing the one or more skeletal model joints selected by the user from the three-dimensional model of the gesture to simplify the skeletal model;

receiving, from the user, a modifiable parameter for the refined three-dimensional model of the gesture, the modifiable parameter comprising a repetition parameter to indicate the gesture should be repeated multiple times when performed; and associating the modifiable parameter with the refined three-dimensional model of the gesture in a gesture model library.

7. The machine of claim 6, wherein the gesture data comprises joint position data.

8. The machine of claim 6, wherein the hand-tracking data comprises video data.

9. The machine of claim 6, wherein providing the display comprises displaying the three-dimensional model on a graphical user interface.

10. The machine of claim 6, wherein receiving model refining data comprises receiving one or more manipulated positions of the one or more joints.

11. A machine-storage medium storing instructions that, when executed by a machine, cause the machine to perform operations comprising:

capturing using one or more cameras, hand-tracking data of a gesture made by a user demonstrating the gesture;

generating a three-dimensional model of the gesture using the hand-tracking data, the three-dimensional model of the gesture including a skeletal model of a hand of the user, the skeletal model comprising a plurality of skeletal model, each skeletal model joint of the plurality of skeletal model joints comprising a vertex in a three-dimensional coordinate system;

providing a display of the three-dimensional model of the gesture to the user;

receiving, from the user, a selection of one or more selected skeletal model joints selected from the plurality of skeletal model joints of the three-dimensional model of the gesture, the one or more selected skeletal model joints selected for removal from the skeletal model to simplify the three-dimensional model;

receiving from the user, model refining data refining the three-dimensional model, the model refining data including the one or more selected skeletal model joints of the three-dimensional model of the gesture;

generating a refined three-dimensional model of the gesture using the model refining data and the three-dimensional model of the gesture by removing the one or more skeletal model joints selected by the user from the three-dimensional model of the gesture to simplify the skeletal model;

receiving, from the user, a modifiable parameter for the refined three-dimensional model of the gesture, the modifiable parameter comprising a repetition parameter to indicate the gesture should be repeated multiple times when performed; and associating the modifiable parameter with the refined three-dimensional model of the gesture in a gesture model library.

12. The machine-storage medium of claim 11, wherein the gesture data comprises joint position data.

13. The machine-storage medium of claim 11, wherein the hand-tracking data comprises video data.

14. The machine-storage medium of claim 11, wherein providing the display comprises displaying the three-dimensional model on a graphical user interface.

15. The machine-storage medium of claim 11, wherein receiving model refining data comprises receiving one or more manipulated positions of the one or more joints.

16. The computer-implemented method of claim 1, further comprising:

capturing, by the one or more processors, using the one or more cameras, additional hand-tracking data of a sequence of gestures made by the user demonstrating the sequence of gestures; and generating, by the one or more processors, a sequence of three-dimensional models of the sequence of gestures using the additional hand-tracking data.

17. The computer-implemented method of claim 16, further comprising:

receiving, by the one or more processors, from the user, additional model refining data and sequence instructions defining a start event and an end event of the sequence of gestures;

generating, by the one or more processors, a sequence of refined three-dimensional models of the sequence of gestures using the additional model refining data and the sequence of three-dimensional models; and storing, by the one or more processors, the sequence of refined three-dimensional models and the sequence instructions in a gesture library.

18. The machine of claim 6, wherein the operations further comprise:

capturing, using the one or more cameras, additional hand-tracking data of a sequence of gestures made by the user demonstrating the sequence of gestures; and generating a sequence of three-dimensional models of the sequence of gestures using the additional hand-tracking data.

19. The machine of claim 18, wherein the operations further comprise:

receiving, from the user, additional model refining data and sequence instructions defining a start event and an end event of the sequence of gestures;

generating a sequence of refined three-dimensional models of the sequence of gestures using the additional model refining data and the sequence of three-dimensional models; and storing the sequence of refined three-dimensional models and the sequence instructions in a gesture library.

20. The machine-storage medium of claim 11, wherein the operations further comprise:

capturing, using the one or more cameras, additional hand-tracking data of a sequence of gestures made by the user demonstrating the sequence of gestures; and generating a sequence of three-dimensional models of the sequence of gestures using the additional hand-tracking data.

21. The machine-storage medium of claim 20, wherein the operations further comprise:

receiving, from the user, additional model refining data and sequence instructions defining a start event and an end event of the sequence of gestures;

generating a sequence of refined three-dimensional models of the sequence of gestures using the additional model refining data and the sequence of three-dimensional models; and storing the sequence of refined three-dimensional models and the sequence instructions in a gesture library.

\* \* \* \* \*